United States Patent
Tourapis et al.

(10) Patent No.: US 12,363,343 B2
(45) Date of Patent: Jul. 15, 2025

(54) BASE MESH DATA AND MOTION INFORMATION SUB-STREAM FORMAT FOR VIDEO-BASED DYNAMIC MESH COMPRESSION

(71) Applicant: Apple Inc., Cupertino, CA (US)

(72) Inventors: Alexandros Tourapis, Los Gatos, CA (US); Dimitri Podborski, Cupertino, CA (US); Jungsun Kim, Sunnyval, CA (US); Khaled Mammou, Danville, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 18/352,973

(22) Filed: Jul. 14, 2023

(65) Prior Publication Data

US 2024/0022765 A1    Jan. 18, 2024

Related U.S. Application Data

(60) Provisional application No. 63/368,866, filed on Jul. 19, 2022, provisional application No. 63/368,477, filed on Jul. 14, 2022.

(51) Int. Cl.
*H04N 19/597* (2014.01)
*H04N 19/159* (2014.01)
(Continued)

(52) U.S. Cl.
CPC ......... *H04N 19/597* (2014.11); *H04N 19/159* (2014.11); *H04N 19/188* (2014.11); *H04N 19/70* (2014.11)

(58) Field of Classification Search
None
See application file for complete search history.

(56) References Cited

U.S. PATENT DOCUMENTS 6,738,062 B1 * 5/2004 Moreton ................. G06T 17/20
                                                       345/423
7,227,545 B2 * 6/2007 Maillot .................. G06T 17/20
                                                       345/428
(Continued)

FOREIGN PATENT DOCUMENTS

CN      113313818       4/2023
KR      10-0511717      9/2005
(Continued)

OTHER PUBLICATIONS

W. Zhu, Y. Xu, L. Li and Z. Li, "Lossless point cloud geometry compression via binary tree partition and intra prediction," 2017 IEEE 19th International Workshop on Multimedia Signal Processing (MMSP), Luton, UK, 2017, pp. 1-6, doi: 10.1109/MMSP.2017.8122226. (Year: 2017).*

(Continued)

*Primary Examiner* — Stefan Gadomski
(74) *Attorney, Agent, or Firm* — Alexander A. Knapp; Kowert, Hood, Munyon, Rankin & Goetzel, P.C.

(57) ABSTRACT

A system comprises an encoder configured to compress and encode data for a three-dimensional mesh. To compress the three-dimensional mesh, the encoder determines a compressed base mesh bit stream and a compressed motion bitstream. A network abstraction layer syntax defined for the compressed base mesh bit stream and the compressed motion bitstream, allows for various parameters to be defined and applied to both bit streams, such as timing information and faceIDs for faces of polygons of the mesh.

20 Claims, 17 Drawing Sheets

(51) Int. Cl.
*H04N 19/169* (2014.01)
*H04N 19/70* (2014.01)

(56) References Cited

U.S. PATENT DOCUMENTS

| | | | |
|---|---|---|---|
| 9,167,164 B2 | 10/2015 | Baek et al. | |
| 10,204,657 B2 | 2/2019 | Yanagita et al. | |
| 10,462,485 B2* | 10/2019 | Mammou | H04N 19/119 |
| 10,762,667 B2* | 9/2020 | Mekuria | G06T 9/001 |
| 10,861,196 B2* | 12/2020 | Mammou | H04N 19/593 |
| 10,909,727 B2* | 2/2021 | Mammou | G06T 9/001 |
| 10,911,787 B2* | 2/2021 | Tourapis | H04N 19/124 |
| 11,010,928 B2* | 5/2021 | Mammou | G06T 9/00 |
| 11,581,022 B2 | 2/2023 | Ilola et al. | |
| 11,625,866 B2 | 4/2023 | Flynn | |
| 12,101,457 B2* | 9/2024 | Ilola | G06T 5/80 |
| 2001/0013866 A1* | 8/2001 | Migdal | G06T 17/20 345/428 |
| 2005/0212804 A1* | 9/2005 | Fong | G06T 17/20 345/473 |
| 2012/0313927 A1* | 12/2012 | Curington | G06T 9/001 345/419 |
| 2019/0081638 A1* | 3/2019 | Mammou | H04N 19/436 |
| 2020/0217937 A1* | 7/2020 | Mammou | G06T 9/004 |
| 2021/0103780 A1* | 4/2021 | Mammou | G06F 18/22 |
| 2021/0134059 A1* | 5/2021 | Crocker | G06T 17/205 |
| 2021/0150771 A1* | 5/2021 | Huang | G01S 17/89 |
| 2021/0209807 A1* | 7/2021 | Oh | H04N 21/816 |
| 2021/0218994 A1* | 7/2021 | Flynn | G06T 9/001 |
| 2021/0319593 A1* | 10/2021 | Flynn | H03M 7/6029 |
| 2021/0320961 A1* | 10/2021 | Lee | H04L 65/70 |
| 2021/0343080 A1* | 11/2021 | Kim | G06N 3/084 |
| 2021/0383576 A1* | 12/2021 | Olivier | G06T 9/001 |
| 2021/0398323 A1* | 12/2021 | Lee | G06T 9/001 |
| 2022/0164994 A1* | 5/2022 | Joshi | G06T 9/001 |
| 2022/0165025 A1* | 5/2022 | Lambert | G06T 15/04 |
| 2023/0134675 A1 | 5/2023 | Ilola et al. | |
| 2023/0290006 A1* | 9/2023 | Hur | H04N 19/513 |
| 2023/0412841 A1* | 12/2023 | Yang | H04N 19/527 |
| 2023/0412849 A1* | 12/2023 | Huang | H04N 19/96 |
| 2023/0419557 A1* | 12/2023 | Yoon | H04N 19/124 |
| 2024/0022765 A1 | 1/2024 | Tourapis et al. | |
| 2024/0062428 A1* | 2/2024 | Oh | G06T 9/40 |
| 2024/0155157 A1* | 5/2024 | Park | H04N 19/184 |
| 2024/0179347 A1* | 5/2024 | Lee | G06T 9/00 |
| 2024/0185467 A1* | 6/2024 | Lee | G06T 9/001 |
| 2024/0196012 A1* | 6/2024 | Oh | H04N 19/105 |

FOREIGN PATENT DOCUMENTS

| | | |
|---|---|---|
| KR | 10-1669873 | 10/2016 |
| KR | 10-2196025 | 12/2020 |

OTHER PUBLICATIONS

J. Kim, J. Im, S. Rhyu and K. Kim, "3D Motion Estimation and Compensation Method for Video-Based Point Cloud Compression," in IEEE Access, vol. 8, pp. 83538-83547, 2020, doi: 10.1109/ACCESS.2020.2991478 (Year: 2020).*

Graziosi, Danillo, et al. "An overview of ongoing point cloud compression standardization activities: Video-based (V-PCC) and geometry-based (G-PCC)." APSIPA Transactions on Signal and Information Processing 9 (2020): e13. (Year: 2020).*

D. B. Graziosi, "Video-Based Dynamic Mesh Coding," 2021 IEEE International Conference on Image Processing (ICIP), Anchorage, AK, USA, 2021, pp. 3133-3137 (Year: 2021).*

Leif Kobbelt. 2000. √3-subdivision. In Proceedings of the 27th annual conference on Computer graphics and interactive techniques (SIGGRAPH '00). ACM Press/Addison-Wesley Publishing Co., USA, 103-112. https://doi.org/10.1145/344779.344835 (Year: 2000).*

CfP for Dynamic Mesh Coding, ISO/IEC JTC 1/SC 29ANG 2, MPEG Technical requirements Convenorship: SES (Finland). N145. Oct. 29, 2021 (39 pages) (Year: 2021).*

* cited by examiner

| person_00000001.obj | person_00000001.mtl |
|---|---|
| # link to material library<br>mtllib  person_00000001.mtl<br># Positions (e.g. Geometry Information)<br>v 64.062500 1237.739990 51.757801<br>v 59.570301 1236.819946 54.899700<br>...<br>v -104.573997 434.458008 175.684006<br>v 98.071899 744.414978 178.248001<br>v 96.240196 781.739990 178.076004<br>v 95.393799 791.934998 178.188004<br># Texture coordinates<br>vt 0.897381 0.740830<br>vt 0.899059 0.741542<br>...<br>vt 0.548180 0.679136<br># link to material<br>usemtl material0000<br># connectivity for geometry and texture<br>f 1/1 2/2 3/3<br>f 4/7 1/1 3/9<br>...<br>f 4318/4318 3539/3539 16453/16453 | newmtl material0000<br>Ka 1.0 1.0 1.0<br>Kd 1.0 1.0 1.0<br>Ks 1.0 1.0 1.0<br>map_Kd<br># link to a 2D image<br>person_00000001.png |

Example of a textured mesh stored in OBJ format.

FIG. 2

BASE MESH DATA AND MOTION INFORMATION SUB-STREAM FORMAT FOR VIDEO-BASED DYNAMIC MESH COMPRESSION

PRIORITY CLAIM

This application claims benefit of priority to U.S. Provisional Application Ser. No. 63/368,477, entitled "Base Mesh Data and Motion Information Sub-Stream Format for Video-Based Dynamic Mesh Compression," filed Jul. 14, 2022, and which is incorporated herein by reference in its entirety. The application also claims benefit of priority to U.S. Provisional Application Ser. No. 63/368,866, entitled "Base Mesh Data and Motion Information Sub-Stream Format for Video-Based Dynamic Mesh Compression," filed Jul. 19, 2022, and which is incorporated herein by reference in its entirety.

TECHNICAL FIELD

This disclosure relates generally to compression and decompression of three-dimensional meshes.

DESCRIPTION OF THE RELATED ART

Various types of sensors, such as light detection and ranging (LIDAR) systems, 3-D-cameras, 3-D scanners, etc. may capture data indicating positions of points in three-dimensional space, for example positions in the X, Y, and Z planes. Also, such systems may further capture attribute information in addition to spatial information for the respective points, such as color information (e.g., RGB values), texture information, intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit.

Such a point could may be represented by a three-dimensional mesh comprising a plurality of polygons with connected vertices that model a surface of the point cloud. Moreover, texture or attribute values of the point cloud may be overlaid on the mesh to represent the attribute or texture of the point cloud when modelled as a three-dimensional mesh.

Additionally, a three-dimensional mesh may be generated, for example in software, without first being modelled as a point cloud. For example, the software may generate the three-dimensional mesh and apply texture or attribute values to represent an object.

SUMMARY OF EMBODIMENTS

In some embodiments, a system includes one or more sensors configured to capture points representing an object in a view of the sensor and to capture texture or attribute values associated with the points of the object. The system also includes one or more computing devices storing program instructions, that when executed, cause the one or more computing devices to generate a three-dimensional dynamic mesh that models the object using vertices and edges that define polygons of the dynamic three-dimensional mesh. Also, in some embodiments, a three-dimensional dynamic mesh may be generated, by the system, without first being captured by one or more sensors. For example, a computer graphics program may generate a dynamic three-dimensional mesh with an associated texture or associated attribute values to represent an object in a scene, without necessarily using sensors or generating points that represents the object.

In some embodiments, an encoder system may encode a geometry of a dynamic three-dimensional mesh by encoding a base mesh and displacement vectors to be applied to the base mesh. For some moments in time an intra-frame encoding technique may be used to encode the base mesh (e.g., intra-encoded temporal frames) and, for the other moments in time, an inter-frame encoding technique may be used to encode displacement vectors describing displacements to be applied to points at sub-division locations of the edges of the base mesh (inter-encoded temporal frames). A compressed bit stream may include a compressed base mesh, compressed displacement values, and compressed attribute information.

In some embodiments, a shared high-level syntax may be used to encapsulate compressed information for the base mesh and compressed information for the displacement vectors. Said, another way, a shared high-level syntax may be used for communicating both the base mesh and the displacements to be applied to the base mesh, also the base mesh may be encoded in the shared high-level syntax using an intra-frame encoder or an inter-frame encoder. The high-level syntax is described herein in detail. At least some advantages of a using a common syntax for both the base mesh and the displacements is the ability to coordinate timing information across the different frames. Also, face IDs may be defined for faces of the polygons of the mesh and may be signaled in a shared high-level syntax and applied for faces included in a base mesh or faces resulting from applying displacement information to the base mesh.

In some embodiments, a shared syntax for the base mesh and for the compressed displacement information may support network abstraction layer units specifying whether a given sub-mesh is visible or not-visible at a particular moment in time (e.g., frame order count (FOC) or picture order count (POC)). For example, for objects (represented by sub-meshes) that come into and out of a scene, it may be more efficient to mark a sub-mesh corresponding to the object as being a non-visible sub-mesh (e.g., when the object leaves the scene), as opposed to signaling the scene without the object present. In this way, inter-prediction that relies on a base mesh representation of the sub-mesh corresponding to the object that enters and leaves the scene, may continue to proceed without having to be re-started when the object enters and leaves the scene. Said another way, when the object is marked as not visible, the base mesh reference for the corresponding sub-mesh may be retained (but just not rendered/displayed in the scene). This allows the base mesh reference for the sub-mesh corresponding to the object to continue to be used as a reference when the object re-appears in the scene. Also, displacement n information for the sub-mesh that is marked as non-visible may continue to be used to update the sub-mesh for the given object (even though the sub-mesh is not visible), this may allow for the sub-mesh to be "ready" to re-appear in the scene in response to a change in the syntax tag indicating the sub-mesh is now visible in the scene.

BRIEF DESCRIPTION OF THE DRAWINGS

FIG. 2 illustrates an alternative example of input information for defining a three-dimensional dynamic mesh, wherein the input information is formatted according to an object format, according to some embodiments.

Figure 1:
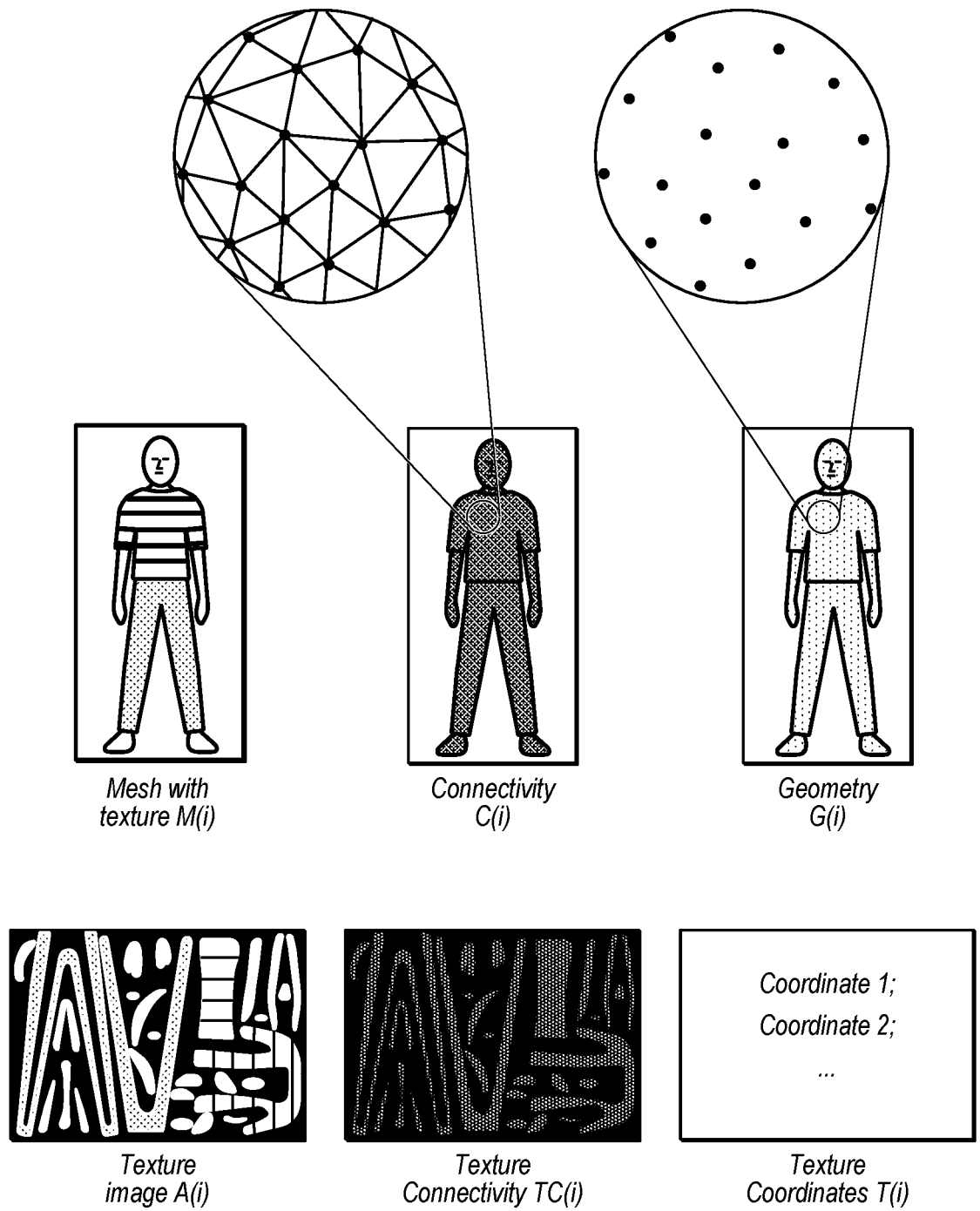
FIG. 1 illustrates example input information for defining a three-dimensional dynamic mesh, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture volumetric content comprising thousands or millions of points in 2-D or 3-D space, such as via LIDAR systems, has increased. Also, the development of advanced display technologies, such as virtual reality or augmented reality systems, has increased potential uses for volumetric content. However, volumetric content files are often very large and may be costly and time-consuming to store and transmit. For example, communication of volumetric content over private or public networks, such as the Internet, may require considerable amounts of time and/or network resources, such that some uses of volumetric content, such as real-time uses, may be limited. Also, storage requirements of volumetric content files may consume a significant amount of storage capacity of devices storing the volumetric content files, which may also limit potential applications for using volumetric content data.

In some embodiments, an encoder may be used to generate compressed volumetric content to reduce costs and time associated with storing and transmitting large volumetric content files. In some embodiments, a system may include an encoder that compresses attribute and/or spatial information of volumetric content such that the volumetric content file may be stored and transmitted more quickly than non-compressed volumetric content and in a manner that the volumetric content file may occupy less storage space than non-compressed volumetric content.

In some embodiments, such encoders and decoders or other encoders and decoders described herein may be adapted to additionally or alternatively encode three-degree of freedom plus (3DOF+) scenes, visual volumetric content, such as MPEG V3C scenes, immersive video scenes, such as MPEG MIV, dynamic mesh compression, such as MPEG VDMC, etc.

In some embodiments, a static or dynamic mesh that is to be compressed and/or encoded may include a set of 3D Meshes $M(0), M(1), M(2), \ldots, M(n)$. Each mesh $M(i)$ may be defined by be a connectivity information $C(i)$, a geometry information $G(i)$, texture coordinates $T(i)$ and texture connectivity $CT(i)$. For each mesh $M(i)$, one or multiple 2D images $A(i, 0), A(i, 1) \ldots, A(i, D-1)$ describing the textures or attributes associated with the mesh may be included. For example, FIG. 1 illustrates an example static mesh, or point in time frame of a dynamic mesh, $M(i)$ comprising connectivity information $C(i)$, geometry information $G(i)$, texture images $A(i)$, texture connectivity information $TC(i)$, and texture coordinates information $T(i)$. Also, FIG. 2 illustrates an example of a textured mesh stored in object (OBJ) format.

For example, the example texture mesh stored in the object format shown in FIG. 2 includes geometry information listed as X, Y, and Z coordinates of vertices and texture coordinates listed as 2D dimensional coordinates for vertices. The example textures and mesh stored in the object format also includes texture connectivity information that indicates mappings between the geometry coordinates and texture coordinates to match texture segments to polygons of the mesh, such as triangles. For example, a first triangle is formed by three vertices, where a first vertex (1/1) is defined as the first geometry coordinate (e.g., 64.062500, 1237.739990, 51.757801), which corresponds with the first texture coordinate (e.g., 0.0897381, 0.740830). The second vertex (2/2) of the triangle is defined as the second geometry coordinate (e.g., 59.570301, 1236.819946, 54.899700), which corresponds with the second texture coordinate (e.g., 0.899059, 0.741542). Finally, the third vertex of the triangle corresponds to the third listed geometry coordinate which matches with the third listed texture coordinate. However, note that in some instances a vertex of a polygon, such as a triangle may map to a set of geometry coordinates and texture coordinates that may have different index positions in the respective lists of geometry coordinates and texture coordinates. For example, the second triangle has a first vertex corresponding to the fourth listed set of geometry coordinates and the seventh listed set of texture coordinates. A second vertex corresponding to the first listed set of geometry coordinates and the first set of listed texture coordinates and a third vertex corresponding to the third listed set of geometry coordinates and the ninth listed set of texture coordinates.

In some embodiments, the geometry information $G(i)$ may represent locations of vertices of the mesh in 3D space and the connectivity $C(i)$ may indicate how the vertices are to be connected together to form polygons that make up the mesh $M(i)$. Also, the texture coordinates $T(i)$ may indicate locations of pixels in a 2D image that correspond to vertices of a corresponding sub-mesh. Attribute patch information may indicate how the texture coordinates defined with respect to a 2D bounding box map into a three-dimensional space of a 3D bounding box associated with the attribute patch based on how the points were projected onto a projection plane for the attribute patch. Also, the texture connectivity information $TC(i)$ may indicate how the vertices represented by the texture coordinates $T(i)$ are to be connected together to form polygons of the sub-meshes. For example, each texture or attribute patch of the texture image $A(i)$ may correspond to a corresponding sub-mesh defined using texture coordinates $T(i)$ and texture connectivity $TC(i)$.

In some embodiments, a mesh encoder may perform a patch generation process, wherein the mesh is subdivided into a set of sub-meshes. The sub-meshes may correspond to the connected components of the texture connectivity or may be different sub-meshes than the texture connectivity of the mesh. In some embodiments, a number and a size of sub-meshes to be determined may be adjusted to balance discontinuities and flexibility to update the mesh, such as via inter-prediction. For example, smaller sub-meshes may allow for a finer granularity of updates to change a particular region of a mesh, such as at a subsequent moment in time using an inter-prediction process. But, a higher number of sub-meshes may introduce more discontinuities.

In some embodiments, signaled bitstream for a dynamic mesh may include information signaled in a sequence parameter set (SPS) or a frame parameter set (FPS) that comprises syntax definitions to be applied when decoding a sequence of frames belonging to the sequence parameter set or to be applied to a given frame corresponding to the frame parameter set. In some embodiments, these syntax definitions may include timing information that can be used to "matchup" encoded base mesh information with encoded displacement vectors, wherein the base mesh information and the displacement vector information are signaled in separate sub-bitstreams. For example, the syntax definitions may include an index or other data structure to indicate which frames of a frame order count correspond to which moments in time. Such a time index may be useful to match encoded frames signaling an instance of a base mesh at a given point in time frame with displacement vectors to be applied to the base mesh at the given point in time frame to reconstruct the dynamic mesh at the given point in time frame.

Also, in some embodiments, as mentioned above, the base mesh may be intra-encoded (e.g., defined using information signaled for a given point in time) or may be inter-encoded (e.g., defined using information signaled for a given point in time that references or is relative to an instance of the base mesh at a different point in time). In such situations, whether the base mesh is intra-encoded or inter-encoded may be signaled using a sequence parameter set and/or a frame parameter set. For example, a sequence parameter set may signal whether or not intra-frame or inter-frame encoding is used. Additionally, or alternatively, whether intra-frame or inter-frame encoding is used may be signaled for each frame using a frame parameter set. Also, in some embodiments, a sequence parameter set may define a "default" mode for a sequence of frames and a frame parameter set may signal deviations from the default. For example, a sequence parameter set may indicate that frames of the sequence are intra-encoded, but, for at least some frames of the set, corresponding frame parameter sets may supersede the mode indicate in the sequence parameter set, such as indicating the at least some frames are inter-encoded. In a similar manner, other encoding/decoding parameters may be signaled using a sequence parameter set and/or frame parameter set, such as what type of decoder to use for decoding intra-encoded frames, what type of decoder to use for decoding inter-encoded frames, and or other decoding parameters to be applied for a sequence of frames and/or individual frames. Moreover, the timing information included in the syntax may allow for referencing reference frames encoded using different types of encoding techniques (e.g., intra or inter frame encoding) and different encoders (e.g., various supported mesh encoders that may be signaled for use in the SPS or FPS).

In some embodiments, the shared syntax may further be used to define sub-meshes and face groups of a mesh or sub-mesh. In some embodiments, data structures for defining sub-meshes and/or face groups may be signaled in the sequence parameter set and/or frame parameter set.

Figure 3:
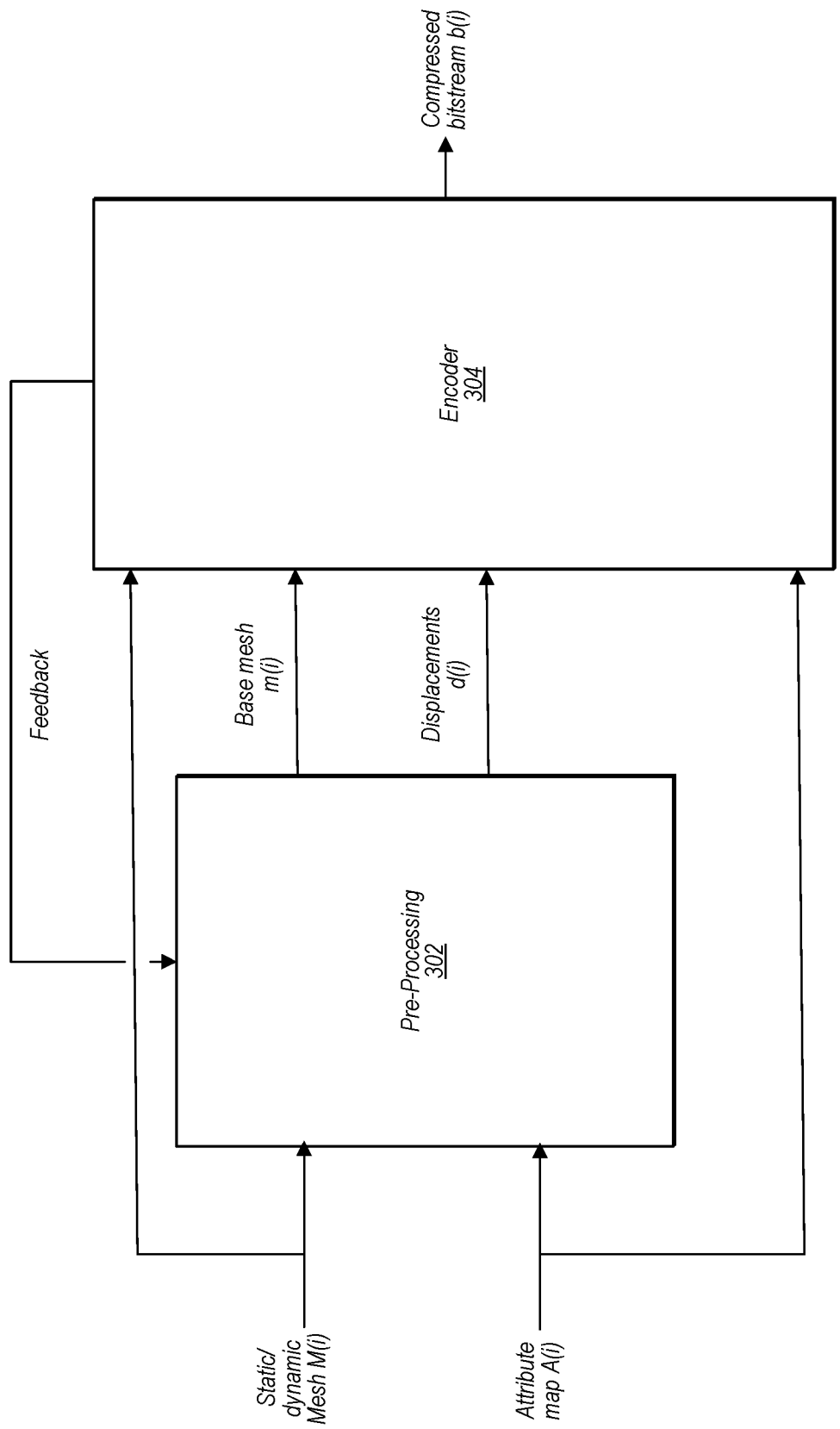
FIG. 3 illustrates an example pre-processor and encoder for encoding a three-dimensional dynamic mesh, according to some embodiments.

FIG. 3 illustrates a high-level block-diagram of an encoding process in some embodiments. Note that the feedback loop during the encoding process makes it possible for the encoder to guide the pre-processing step and changes its parameters to achieve the best possible compromise according to various criteria, such as: rate-distortion, encoding/decoding complexity, random access, reconstruction complexity, terminal capabilities, encoder/decoder power consumption, network bandwidth and latency, and/or other factors.

In the case of dynamic meshes, a temporally consistent re-meshing process, which may produce that the same subdivision structure that is shared by the current mesh M'(i) and a reference mesh M'(j) may be used. Such a coherent temporal re-meshing process makes it possible to skip (for later frames) the encoding of the base mesh m(i) and re-use the base mesh m(j) associated with the reference frame M(j). This also enables better temporal prediction for both the attribute and geometry information. More precisely, a motion field f(i) describing how to move the vertices of m(j) to match the positions of m(i) may be computed and encoded. Such process is described in FIG. 4.

In some embodiments, the base mesh m(i) associated with the current frame is first quantized (e.g., using uniform quantization) and encoded by using a static mesh encoder. The proposed scheme is agnostic of which mesh encoding codec is used. The mesh encoding codec used could be specified explicitly in the bitstream by encoding a mesh codec ID or could be implicitly defined/fixed by specification or the application.

Depending on the application and the targeted bitrate/visual quality, the encoder encodes a set of displacement vectors associated with the subdivided mesh vertices, referred to as the displacement field d(i).

The reconstructed quantized base mesh m'(i) is then used to update the displacement field d(i) to generate an updated displacement field d'(i) so it takes into account the differences between the reconstructed base mesh m'(i) and the original base mesh m(i). By exploiting the subdivision surface mesh structure, a wavelet transform is then applied to d'(i) and a set of wavelet coefficients are generated. The wavelet coefficients are then quantized, packed into a 2D image/video, and compressed by using an image/video encoder. The encoding of the wavelet coefficients may be lossless or lossy. The reconstructed version of the wavelet coefficients is obtained by applying image unpacking and inverse quantization to the reconstructed wavelet coefficients video generated during the video encoding process. Reconstructed displacements d"(i) are then computed by applying the inverse wavelet transform to the reconstructed wavelet coefficients. A reconstructed base mesh m"(i) is obtained by applying inverse quantization to the reconstructed quantized base mesh m'(i). The reconstructed deformed mesh DM(i) is obtained by subdividing m"(i) and applying the reconstructed displacements d" (i) to its vertices.

Since the quantization step or/and the mesh compression module may be lossy, a reconstructed quantized version of m(i), denoted as m'(i), is computed. If the mesh information is losslessly encoded and the quantization step is skipped, m(i) would exactly match m'(i).

Figure 4:
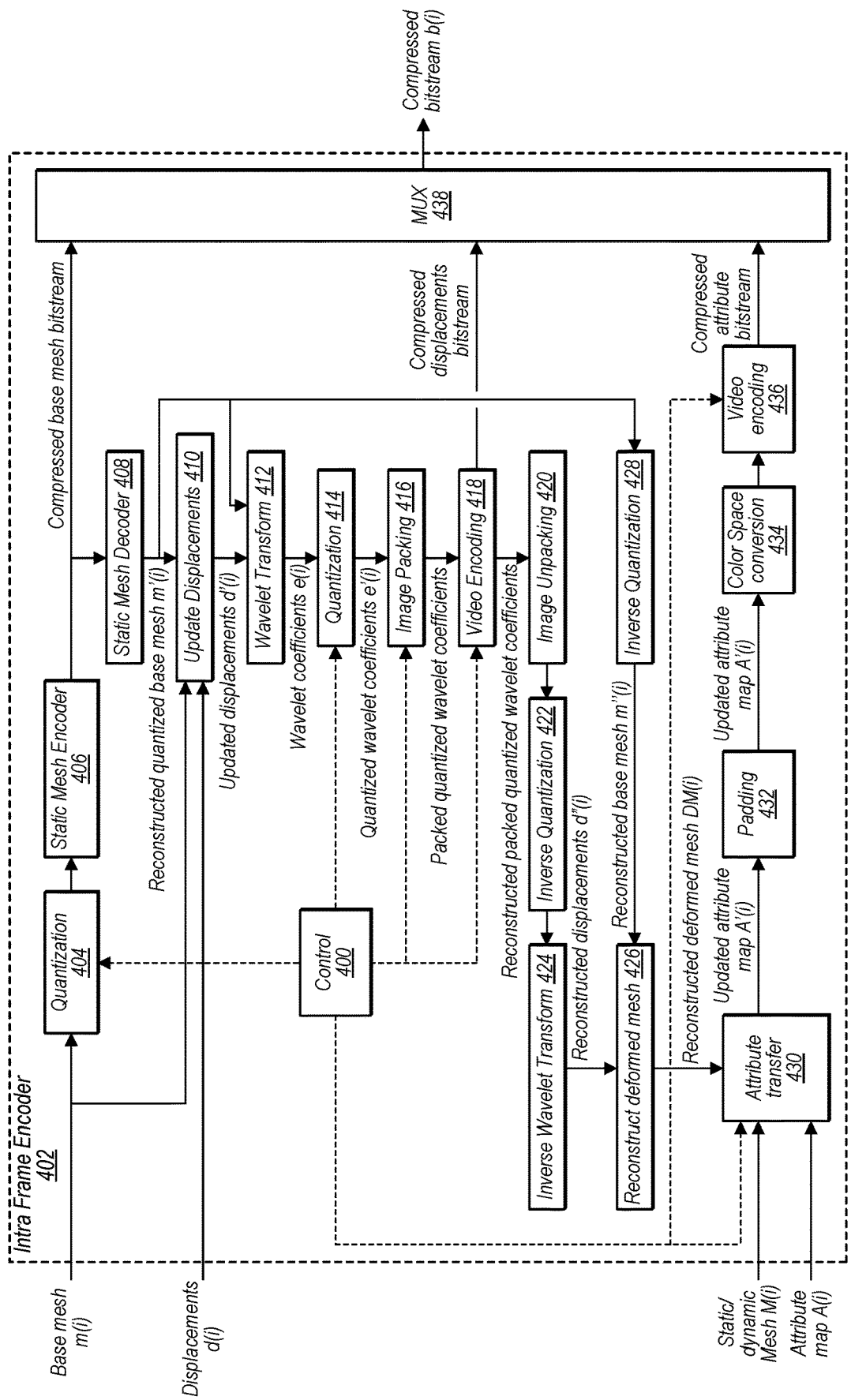
FIG. 4 illustrates a more-detailed view of an example intra-frame encoder for encoding a point in time frame of a three-dimensional dynamic mesh, according to some embodiments.
Figure 6:
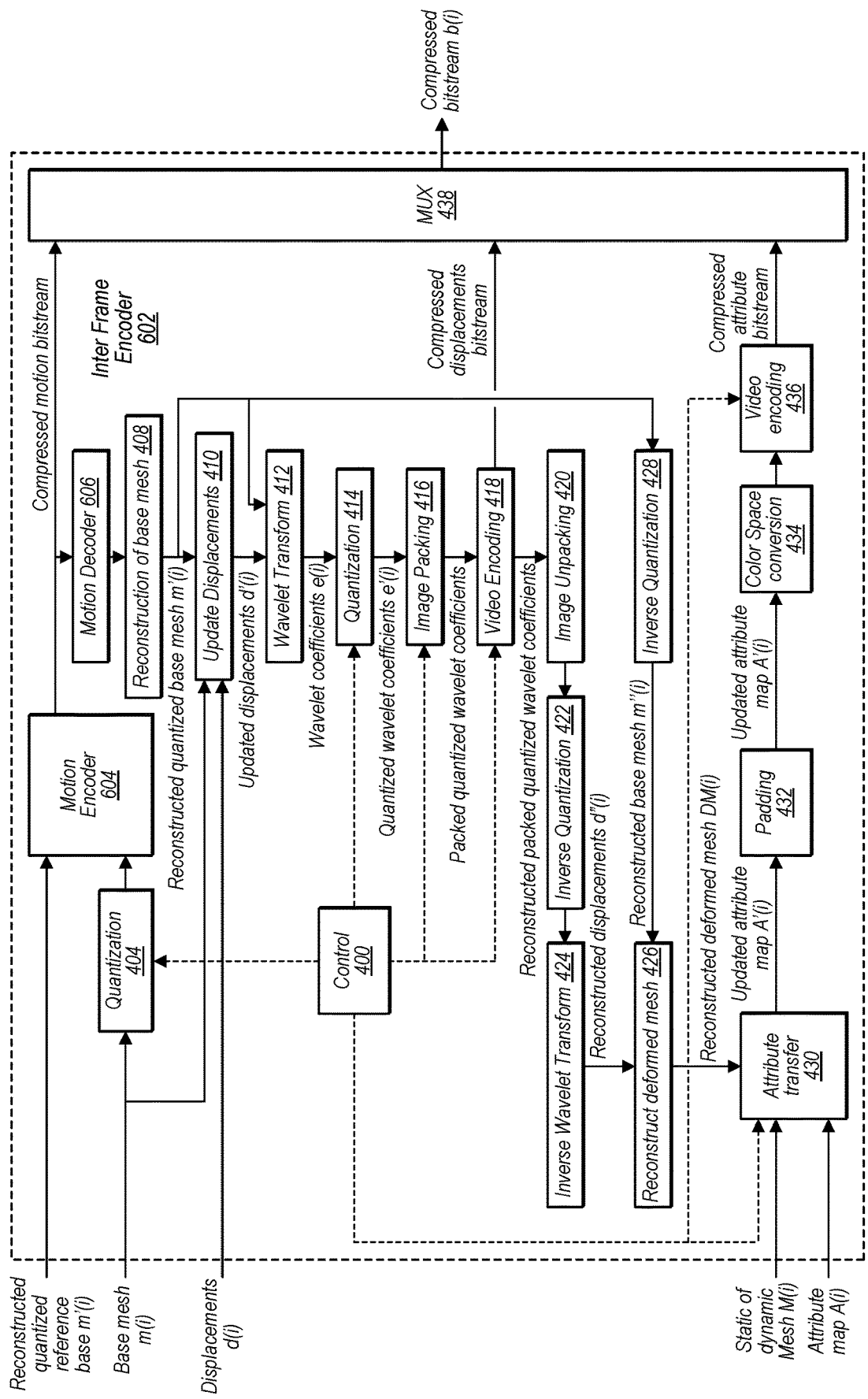
FIG. 6 illustrates a more-detailed view of an example inter-frame encoder for encoding a point in time frame of a three-dimensional dynamic mesh, according to some embodiments.
Figure 8:
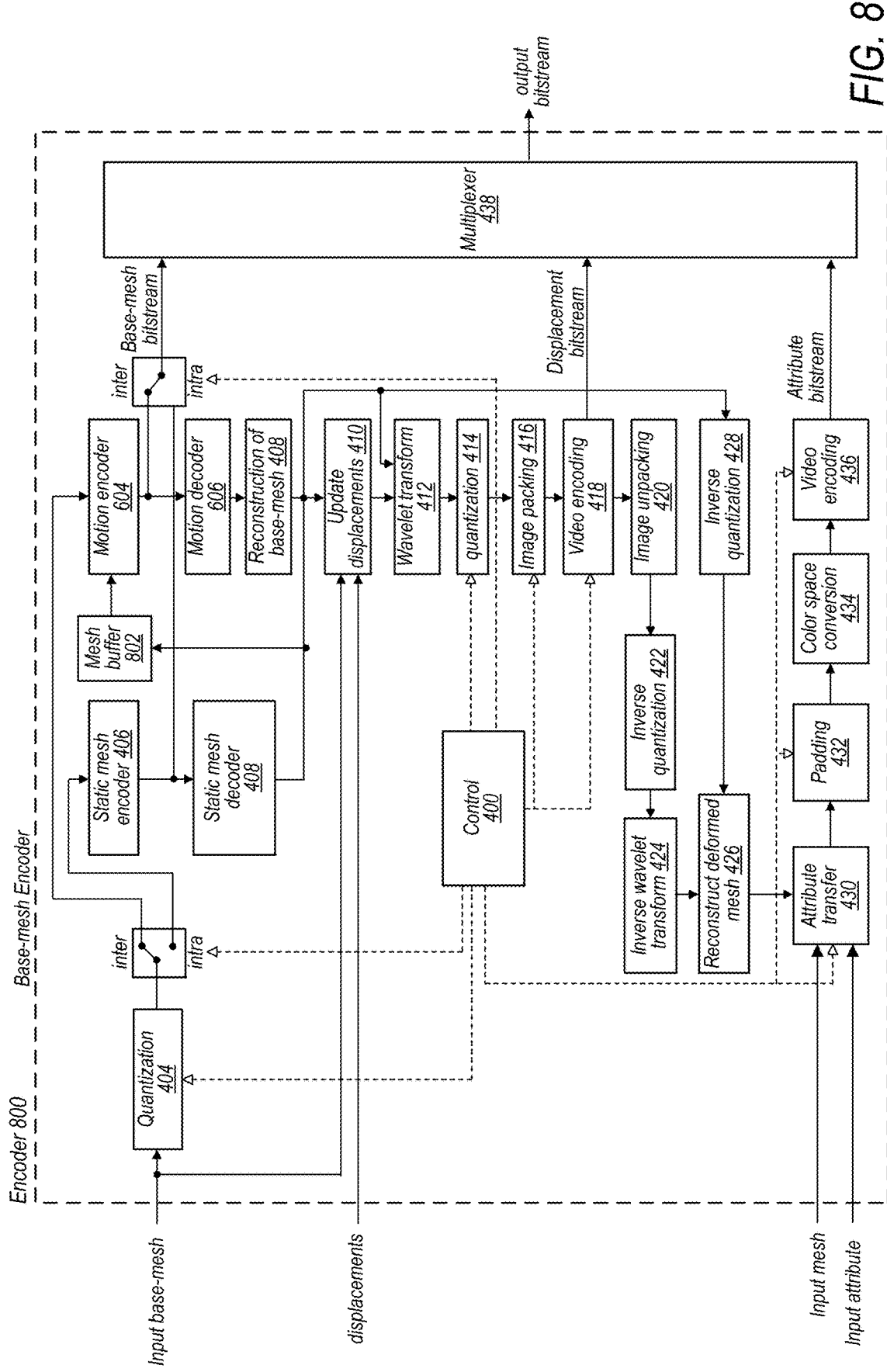
FIG. 8 illustrates the intra-frame encoder and the inter-frame encoder together in a combined configuration, according to some embodiments.

For example, in FIG. 3 a static or dynamic mesh is received at pre-processing 302. Also, an attribute map representing how attribute images (e.g., texture images) for the static/dynamic mesh are to be mapped to the mesh is received at pre-processing module 302. For example, the attribute map may include texture coordinates and texture connectivity for texture images for the mesh. The pre-processing module 302 separates the static/dynamic mesh M(i) into a base mesh m(i) and displacements d(i). Where the displacements represent how vertices are to be displaced to re-create the original static/dynamic mesh from the base mesh. For example, in some embodiments, vertices included in the original static/dynamic mesh may be omitted from the base mesh (e.g., the base mesh may be a compressed version of the original static/dynamic mesh). As will be discussed in more detail below, a decoder may predict additional vertices to be added to the base mesh, for example by sub-dividing edges between remaining vertices included in the base mesh. In such an example, the displacements may indicate how the additional vertices are to be displaced, wherein the displacement of the added vertices modifies the base mesh to better represent the original static/dynamic mesh. For example, FIG. 4 illustrates a detailed intra frame encoder 402 that may be used to encode a base mesh m(i) and displacements d(i) for added vertices. For dynamic meshes, an inter frame encoder, such as shown in FIG. 6 may be used. As can be seen in FIG. 6, instead of signaling a new base mesh for each frame, instead a base mesh for a current time frame can be compared to a reconstructed quantized reference base mesh m'(i) (e.g., the base mesh the decoder will see from the previous point in time frame) and motion vectors to represent how the current base mesh has changed relative to the reference base mesh may be encoded in lieu of encoding a new base mesh for each frame. Note that the motion vectors may not be encoded directly but may be further compressed to take advantage of relationships between the motion vectors. Also, not that the intra frame encoder 402 and inter frame encoder 602 are shown separately for ease of illustration. However, in some embodiments, some point it time frames of a dynamic mesh may have their respective base meshes encoded using an intra-frame technique, such as shown in FIG. 4 or an inter-frame technique, such as shown in FIG. 6. For example, FIG. 8 illustrates a toggle choice between inter and intra base mesh encoding.

The separated base mesh m(i) and displacements d(i) that have been separated by pre-processing module 302 are provided to encoder 304, which may be an intra-frame encoder as shown in FIG. 4 or an inter-frame encoder as shown in FIG. 6. Also, the attribute map A(i) is provided to the encoder 304. In some embodiments, the original static/dynamic mesh M(i) may also be provided to the encoder 304, in addition to the base mesh m(i) and displacements d(i). For example, the encoder 304 may compare a reconstructed version of the static/dynamic mesh (that has been reconstructed from the base mesh m(i) and displacements d(i)) in order to determine geometric distortion. In some embodiments, an attribute transfer process may be performed to adjust the attribute values of the attribute images to account for this slight geometric distortion. In some embodiments, feedback may be provided back to pre-processing 302, for example to reduce distortion, by changing how the original static/dynamic mesh is decimated to generate the base mesh. Note that in some embodiments an intra-frame encoder and an inter-frame encoder may be combined into a single encoder that includes logic to toggle between intra-frame encoding and inter-frame encoding. The output of the encoder 304 is a compressed bit stream representing the original static/dynamic mesh and its associated attributes/textures.

With regard to mesh decimation, in some embodiments, a portion of a surface of a static/dynamic mesh may be thought of as an input 2D curve (represented by a 2D polyline), referred to as an "original" curve. The original curve may be first down-sampled to generate a base curve/polyline, referred to as a "decimated" curve. A subdivision scheme may then be applied to the decimated polyline to generate a "subdivided" curve. For instance, a subdivision scheme using an iterative interpolation scheme may be applied. The subdivision scheme may include inserting at each iteration a new point in the middle of each edge of the polyline. The inserted points represent additional vertices that may be moved by the displacements.

For example, the subdivided polyline is then deformed to get a better approximation of the original curve. More precisely, a displacement vector is computed for each vertex of the subdivided mesh such that the shape of the displaced curve approximates the shape of the original curve. An advantage of the subdivided curve is that it has a subdivision structure that allows efficient compression, while it offers a faithful approximation of the original curve. The compression efficiency is obtained thanks to the following properties:

- The decimated/base curve has a low number of vertices and requires a limited number of bits to be encoded/transmitted.
- The subdivided curve is automatically generated by the decoder once the base/decimated curve is decoded (e.g., no need to signal or hardcode at the decoder any information other than the subdivision scheme type and subdivision iteration count).
- The displaced curve is generated by decoding and applying the displacement vectors associated with the subdivided curve vertices. Besides allowing for spatial/quality scalability, the subdivision structure enables efficient wavelet decomposition, which offers high compression performance (e.g., with respect to rate-distortion performance).

For example, FIG. 4 illustrates a more-detailed view of an example intra-frame encoder, according to some embodiments.

In some embodiments, intra-frame encoder 402 receives base mesh m(i), displacements d(i), the original static/dynamic mesh M(i) and attribute map A(i). The base mesh m(i) is provided to quantization module 404, wherein aspects of the base mesh may (optionally) be further quantized. In some embodiments, various mesh encoders may be used to encode the base mesh. Also, in some embodiments, intra-frame encoder 402 may allow for customization, wherein different respective mesh encoding schemes may be used to encode the base mesh. For example, static mesh encoder 406 may be a selected mesh encoder selected from a set of viable mesh encoder, such as a DRACO encoder (or another suitable encoder). As described in more detail herein, which type of encoder is used may be signaled in a sequence parameter set (SPS) or frame parameter set (FPS). The encoded base mesh, that has been encoded by static mesh encoder 406 is provided to multiplexer (MUX) 438 for inclusion in the compressed bitstream b(i). Additionally, the encoded base mesh is provided to static mesh decoder 408 in order to generate a reconstructed version of the base mesh (that a decoder will see). This reconstructed version of the base mesh is used to update the displacements d(i) to take into account any geometric distortion between the original base mesh and a reconstructed version of the base mesh (that a decoder will see). For example, static mesh decoder 408 generates reconstructed quantized base mesh m'(i) and provides the reconstructed quantized base mesh m'(i) to displacement update module 410, which also receives the original base mesh and the original displacement d(i). The displacement update module 410 compares the reconstructed quantized base mesh m'(i) (that the decoder will see) to the base mesh m(i) and adjusts the displacements d(i) to account for differences between the base mesh m(i) and the reconstructed quantized base mesh m'(i). These updated displacements d'(i) are provided to wavelet transform 412 which applies a wavelet transformation to further compress the updated displacements d'(i) and outputs wavelet coefficients e(i), which are provided to quantization module 414 which generates quantized wavelet coefficients e'(i). The quantized wavelet coefficients may then be packed into a 2D image frame via image packing module 416, wherein the packed 2D image frame is further video encoded via video encoding 418. The encoded video images are also provided to multiplexer (MUX) 438 for inclusion in the compressed bit stream b(i).

In addition, in order to account for any geometric distortion introduced relative to the original static/dynamic mesh, an attribute transfer process 430 may be used to modify attributes to account for differences between a reconstructed deformed mesh DM(i) and the original static/dynamic mesh.

For example, video encoding 418 may further perform video decoding (or a complimentary video-decoding module may be used (which is not shown in FIG. 4)). This produces reconstructed packed quantized wavelet coefficients that are unpacked via image unpacking module 420. Furthermore, inverse quantization may be applied via inverse quantization module 422 and inverse wavelet transform 424 may be applied to generate reconstructed displacements d"(i). Also, the reconstructed quantized base mesh m'(i) that was generated by static mesh decoder 408 may be inverse quantized via inverse quantization module 428 to generate reconstructed base mesh m"(i). The reconstructed deformed mesh generation module 426 applies the reconstructed displacements d"(i) to the reconstructed base mesh m"(i) to generate reconstructed deformed mesh DM(i). Note that the reconstructed deformed mesh DM(i) represents the reconstructed mesh that a decoder will generate, and accounts for any geometric deformation resulting from losses introduced in the encoding process.

Attribute transfer module 430 compares the geometry of the original static/dynamic mesh M(i) to the reconstructed deformed mesh DM(i) and updates the attribute map to account for any geometric deformations, this updated attribute map is output as updated attribute map A'(i). The updated attribute map A'(i) is then padded (at padding module 432), wherein a 2D image comprising the attribute images is padded such that spaces not used to communicate the attribute images have a padding applied. In some embodiments, a color space conversion is optionally applied at color space conversion module 434. For example, an RGB color space used to represent color values of the attribute images may be converted to a YCbCr color space, also color space sub-sampling may be applied such as 4:2:0, 4:0:0, etc. color space sub-sampling. The updated attribute map A'(i) that has been padded and optionally color space converted is then video encoded via video encoding module 436 and is provided to multiplexer 438 for inclusion in compressed bitstream b(i).

In some embodiments, a controller 400 may coordinate the various quantization and inverse quantization steps as well as the video encoding and decoding steps such that the inverse quantization "undoes" the quantization and such that the video decoding "undoes" the video encoding. Also, the attribute transfer module 430 may take into account the level of quantization being applied based on communications from the controller 400.

Figure 5:
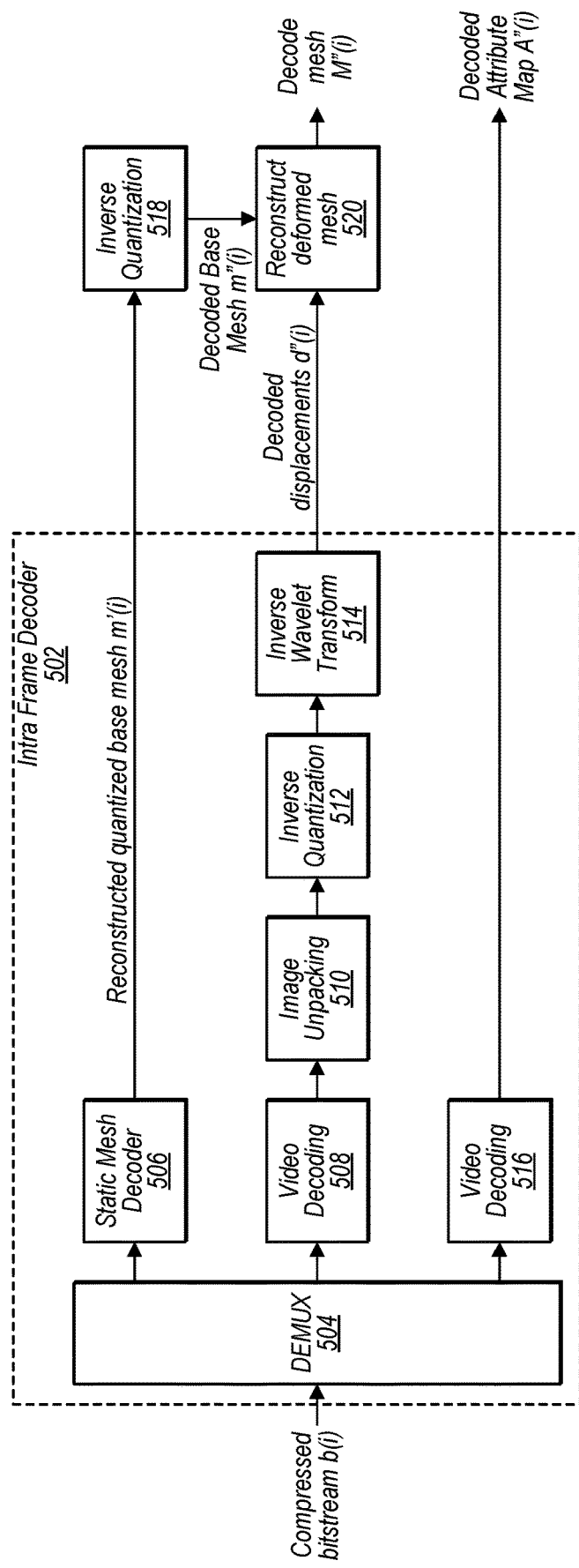
FIG. 5 illustrates an example intra-frame decoder for decoding a point in time frame of a three-dimensional dynamic mesh, according to some embodiments.

FIG. 5 illustrates an example intra-frame decoder for decoding a three-dimensional mesh, according to some embodiments.

Intra frame decoder 502 receives a compressed bitstream b(i), such as the compressed bit stream generated by the intra frame encoder 402 shown in FIG. 4. Demultiplexer (DEMUX) 504 parses the bitstream into a base mesh sub-component, a displacement sub-component, and an attribute map sub-component. Static mesh decoder 506 decodes the base mesh sub-component to generate a reconstructed quantized base mesh m'(i), which is provided to inverse quantization module 518, which in turn outputs decoded base mesh m"(i) and provides it to reconstructed deformed mesh generator 520.

Also, the displacement sub-component of the bit stream is provided to video decoding 508, wherein video encoded image frames are video decoded and provided to image unpacking 510. Image unpacking 510 extracts the packed displacements from the video decoded image frame and provides them to inverse quantization 512 wherein the displacements are inverse quantized. Also, the inverse quantized displacements are provided to inverse wavelet transform 514, which outputs decoded displacements d"(i). Reconstructed deformed mesh generator 520 applies the decoded displacements d"(i) to the decoded base mesh m" (i) to generate a decoded static/dynamic mesh M"(i). Also, the attribute map sub-component is provided to video decoding 516, which outputs a decoded attribute map A"(i). A reconstructed version of the three-dimensional visual content can then be rendered at a device associated with the decoder using the decoded mesh M"(i) and the decoded attribute map A"(i).

As shown in FIG. 5, a bitstream is de-multiplexed into three or more separate sub-streams:
  mesh sub-stream,
  displacement sub-stream for positions and potentially for each vertex attribute, and
  attribute map sub-stream for each attribute map.

The mesh sub-stream is fed to the mesh decoder to generate the reconstructed quantized base mesh m'(i). The decoded base mesh m"(i) is then obtained by applying inverse quantization to m'(i). The proposed scheme is agnostic of which mesh codec is used. The mesh codec used could be specified explicitly in the bitstream or could be implicitly defined/fixed by the specification or the application.

The displacement sub-stream could be decoded by a video/image decoder. The generated image/video is then un-packed and inverse quantization is applied to the wavelet coefficients. In an alternative embodiment, the displacements could be decoded by dedicated displacement data decoder. The proposed scheme is agnostic of which codec/standard is used. Image/video codecs such as [HEVC][AVC] [AV1][AV2][JPEG][JPEG2000] could be used. The motion decoder used for decoding mesh motion information or a dictionary-based decoder such as ZIP could be for example used as the dedicated displacement data decoder. The decoded displacement d"(i) is then generated by applying the inverse wavelet transform to the unquantized wavelet coefficients. The final decoded mesh is generated by applying the reconstruction process to the decoded base mesh m"(i) and adding the decoded displacement field d"(i).

The attribute sub-stream is directly decoded by the video decoder and the decoded attribute map A"(i) is generated as output. The proposed scheme is agnostic of which codec/standard is used. Image/video codecs such as [HEVC][AVC] [AV1][AV2][JPEG][JPEG2000] is used. Alternatively, an attribute sub-stream could be decoded by using non-image/video decoders (e.g., using a dictionary-based decoder such as ZIP). Multiple sub-streams, each associated with a different attribute map, could be decoded. Each sub-stream could use a different codec.

FIG. 6 illustrates a more-detailed view of an example inter-frame encoder, according to some embodiments.

In some embodiments, inter frame encoder 602 may include similar components as the intra-frame encoder 402, but instead of encoding a base mesh, the inter-frame encoder may encode motion vectors that can be applied to a reference base mesh to generate, at a decoder, a current base mesh.

For example, in the case of dynamic meshes, a temporally consistent re-meshing process is used, which may produce a same subdivision structure that is shared by the current base mesh M'(i) and a reference base mesh M'(j). Such a coherent temporal re-meshing process makes it possible to skip the encoding of the base mesh m(i) and re-use the base mesh m(j) associated with the reference frame M(j). This also enables better temporal prediction for both the attribute and geometry information. More precisely, a motion field f(i) describing how to move the vertices of m(j) to match the positions of m(i) may be computed and encoded. Such process is described in FIG. 6. For example, motion encoder 604 may generate the motion field f(i) describing how to move the vertices of m(j) to match the positions of m(i).

In some embodiments, the base mesh m(i) associated with the current frame is first quantized (e.g., using uniform quantization) and encoded by using a static mesh encoder. The proposed scheme is agnostic of which mesh codec is used. The mesh codec used could be specified explicitly in the bitstream by encoding a mesh codec ID or could be implicitly defined/fixed by the specification or the application.

Depending on the application and the targeted bitrate/visual quality, the encoder could optionally encode a set of displacement vectors associated with the subdivided mesh vertices, referred to as the displacement field d(i).

The reconstructed quantized base mesh m'(i) (e.g., output of reconstruction of motion decoder 606 and base mesh reconstruction 408) is then used to update the displacement field d(i) (at update displacements module 410) to generate an updated displacement field d'(i) so it takes into account the differences between the reconstructed base mesh m'(i) and the original base mesh m(i). By exploiting the subdivision surface mesh structure, a wavelet transform is then applied, at wavelet transform 412, to d'(i) and a set of wavelet coefficients are generated. The wavelet coefficients are then quantized, at quantization 414, packed into a 2D image/video (at image packing 416), and compressed by using an image/video encoder (at video encoding 418). The encoding of the wavelet coefficients may be lossless or lossy. The reconstructed version of the wavelet coefficients is obtained by applying image unpacking and inverse quantization to the reconstructed wavelet coefficients video generated during the video encoding process (e.g., at 420, 422, and 424). Reconstructed displacements d"(i) are then computed by applying the inverse wavelet transform to the reconstructed wavelet coefficients. A reconstructed base mesh m"(i) is obtained by applying inverse quantization to the reconstructed quantized base mesh m'(i). The reconstructed deformed mesh DM(i) is obtained by subdividing m"(i) and applying the reconstructed displacements d"(i) to its vertices.

Since the quantization step or/and the mesh compression module may be lossy, a reconstructed quantized version of m(i), denoted as m'(i), is computed. If the mesh information is losslessly encoded and the quantization step is skipped, m(i) would exactly match m'(i).

As shown in FIG. 6, a reconstructed quantized reference base mesh m'(j) is used to predict the current frame base mesh m(i). The pre-processing module 302 described in FIG. 3 could be configured such that m(i) and m(j) share the same:
  number of vertices,
  connectivity,
  texture coordinates, and
  texture connectivity.

The motion field f(i) is computed by considering the quantized version of m(i) and the reconstructed quantized base mesh m'(j). Since m'(j) may have a different number of vertices than m(j) (e.g., vertices may get merged/removed), the encoder keeps track of the transformation applied to m(j) to get m'(j) and applies it to m(i) to guarantee a 1-to-1 correspondence between m'(j) and the transformed and quantized version of m(i), denoted m*(i). The motion field f(i) is computed by subtracting the quantized positions p(i, v) of the vertex v of m*(i) from the positions p(j, v) of the vertex v of m'(j):

$$f(i,v)=p(i,v)-p(j,v)$$

The motion field is then further predicted by using the connectivity information of m'(j) and is entropy encoded (e.g., context adaptive binary arithmetic encoding could be used).

Since the motion field compression process could be lossy, a reconstructed motion field denoted as f (i) is computed by applying the motion decoder module 408. A reconstructed quantized base mesh m'(i) is then computed by adding the motion field to the positions of m'(j). The remaining of the encoding process is similar to the Intra frame encoding.

Figure 7:
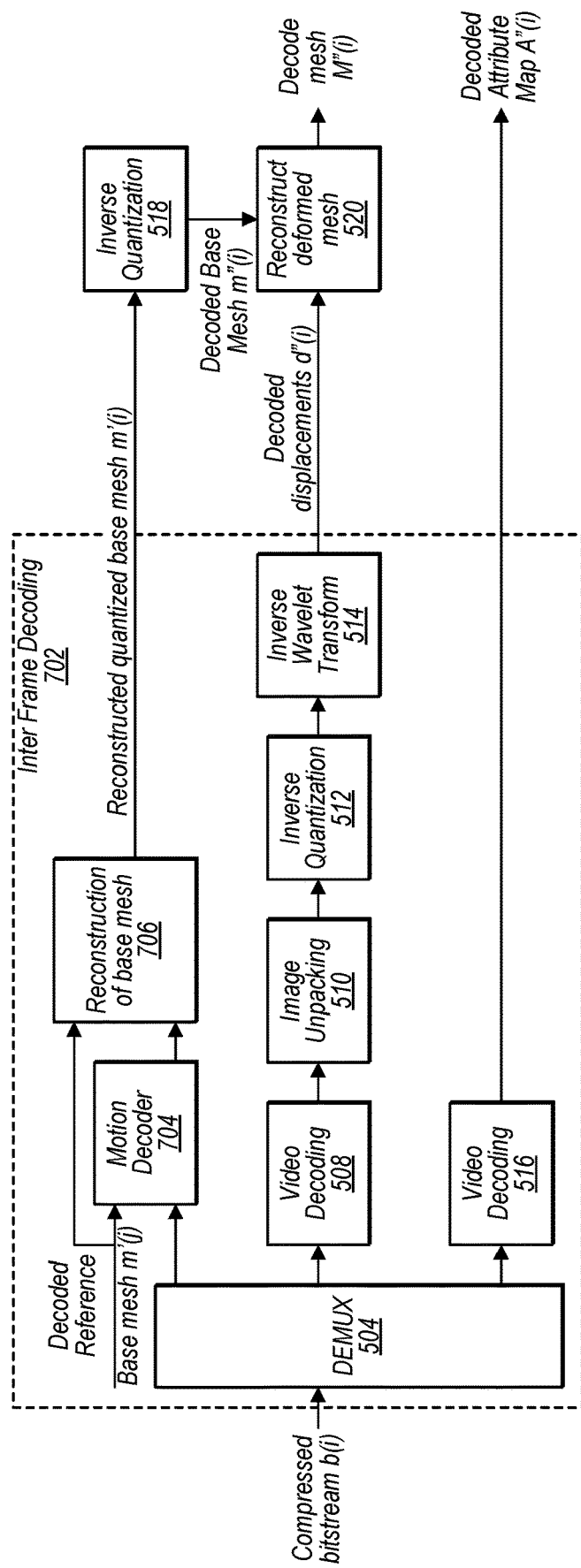
FIG. 7 illustrates an example inter-frame decoder for decoding a point in time frame of a three-dimensional dynamic mesh, according to some embodiments.

FIG. 7 illustrates an example inter-frame decoder for decoding a three-dimensional mesh, according to some embodiments.

Inter frame decoder 702 includes similar components as intra frame decoder 502 shown in FIG. 5. However, instead of receiving a directly encoded base mesh, the inter frame decoder 702 reconstructs a base mesh for a current frame based on motion vectors relative to a reference frame. For example, inter-frame decoder 702 includes motion field/vector decoder 704 and reconstruction of base mesh module 706.

In a similar manner to the intra-frame decoder, the inter-frame decoder 702 separates the bitstream into three separate sub-streams:
  a motion sub-stream,
  a displacement sub-stream, and
  an attribute sub-stream.

The motion sub-stream is decoded by applying the motion decoder 704. The proposed scheme is agnostic of which codec/standard is used to decode the motion information. For instance, any motion decoding scheme could be used. The decoded motion is then optionally added to the decoded reference quantized base mesh m'(j) to generate the reconstructed quantized base mesh m'(i), i.e., the already decoded mesh at instance j can be used for the prediction of the mesh at instance i. Afterwards, the decoded base mesh m"(i) is generated by applying the inverse quantization to m'(i).

The displacement and attribute sub-streams are decoded in a similar manner as in the intra frame decoding process described with regard to FIG. 5. The decoded mesh M"(i) is also reconstructed in a similar manner.

The inverse quantization and reconstruction processes are not normative and could be implemented in various ways and/or combined with the rendering process.

FIG. 8 illustrates the intra-frame encoder and the inter-frame encoder together in a combined configuration, according to some embodiments.

Similar components as already discussed for intra frame encoder 402 shown in FIG. 4 and intra-frame encoder 602 shown in FIG. 6, are also included in the combined encoder 800 shown in FIG. 8. However additional inter/intra encoding decision toggles are added as well as mesh buffer 802. The controller 400 may determine whether to inter-encode or intra-encode a base mesh for a given point in time frame based on how different the current point in time frame is as compared to a reference point in time frame. Based on this decision, the controller 400 instructs the inter/intra encoding decision toggles to switch between intra frame encoding of the base mesh and inter frame encoding of the base mesh.

Figure 9:
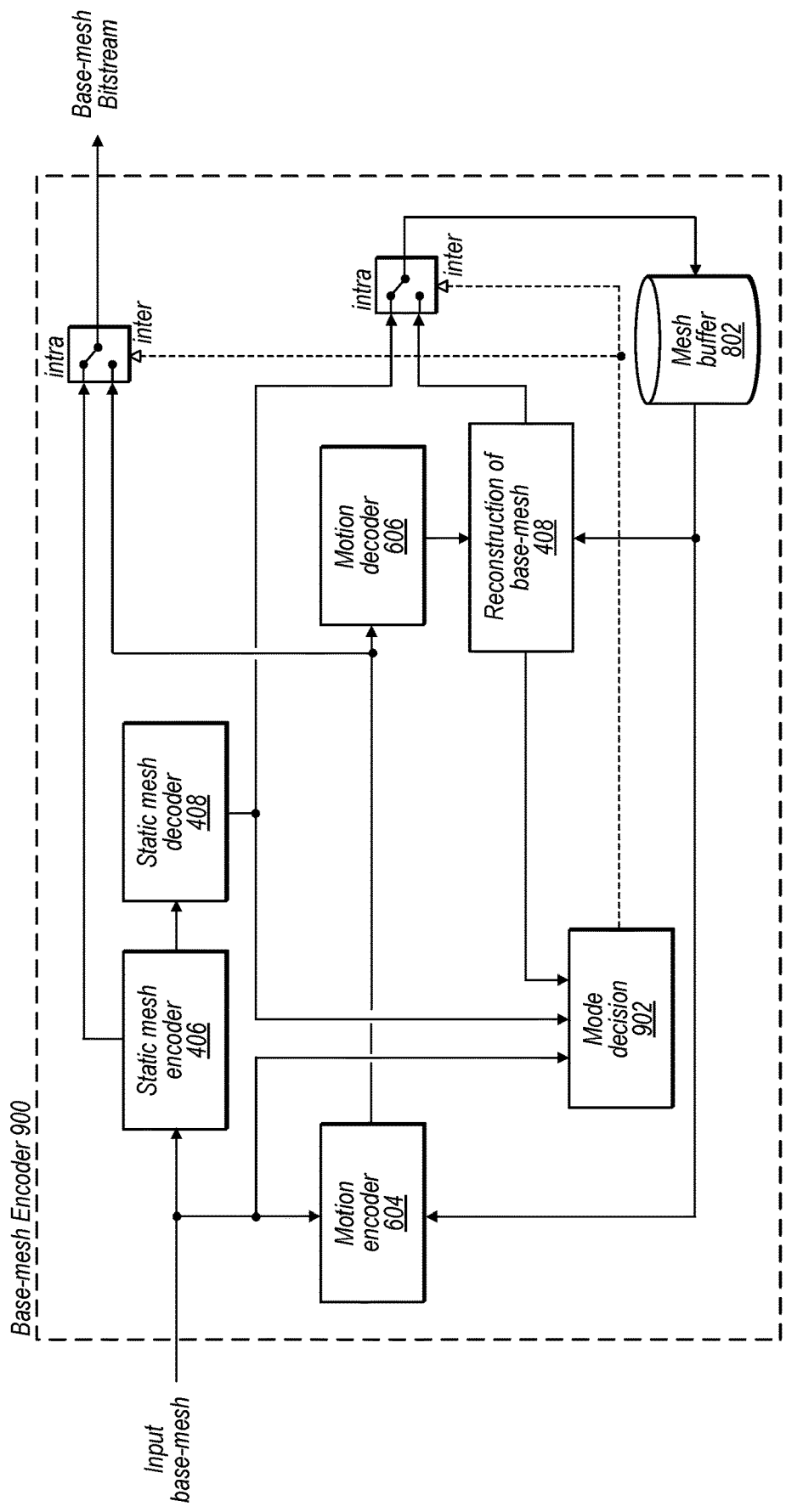
FIG. 9 illustrates additional details of the base-mesh encoder included in FIGS. 4, 6, and 8, according to some embodiments.

FIG. 9 illustrates additional details of the base-mesh encoder included in FIGS. 4, 6, and 8, according to some embodiments.

For simplicity of illustration, base mesh encoder 900 shown in FIG. 9 shows the components involved in base mesh encoding, such as the static mesh encoder 406, base mesh motion encoder 604, etc. as well as mode decision 902 that selects between an intra-frame encoding mode and an inter-frame encoding mode.

Figure 10:
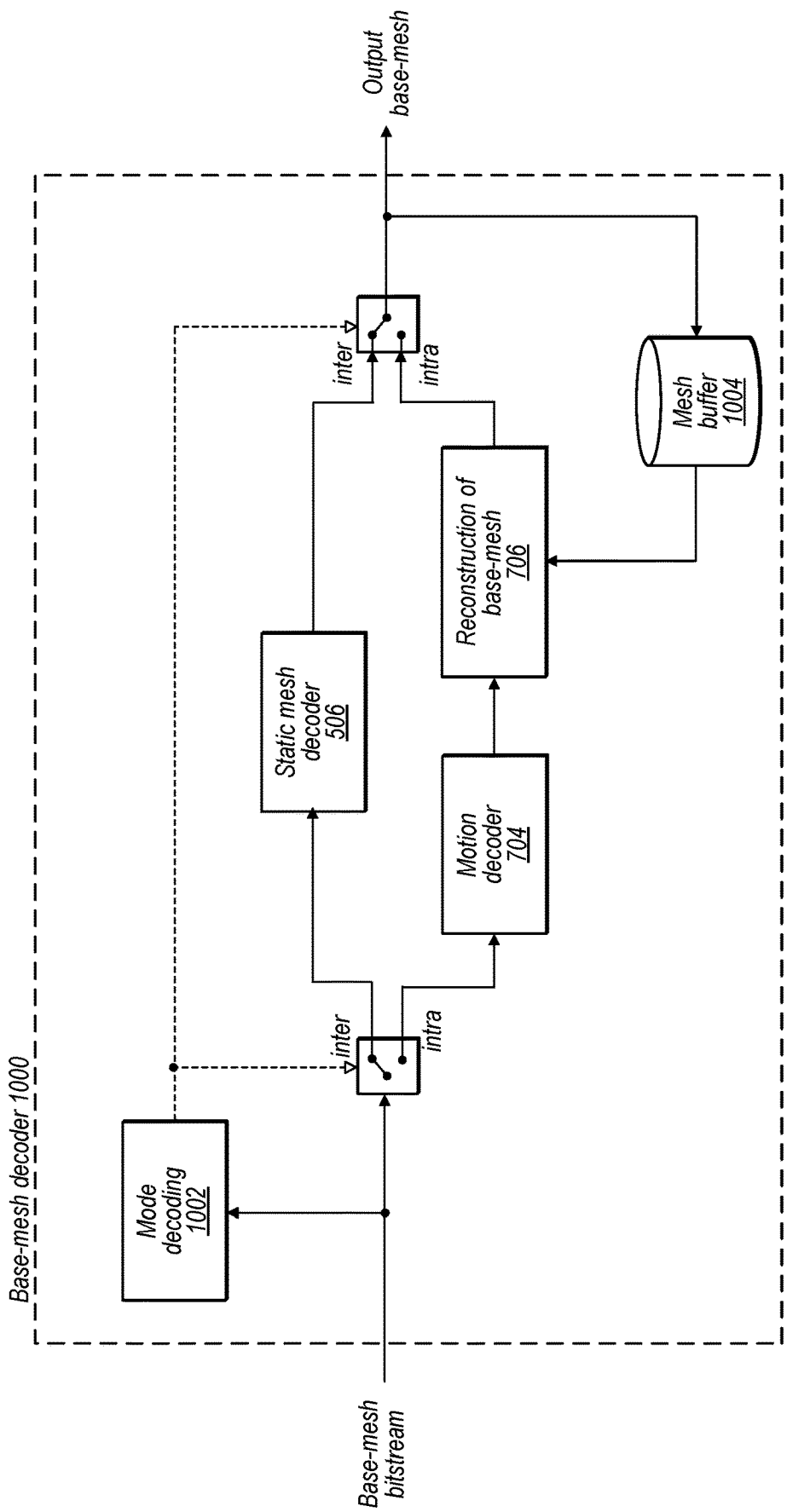
FIG. 10 illustrates additional details of the base-mesh decoder included in FIGS. 5 and 7, according to some embodiments.

FIG. 10 illustrates additional details of the base-mesh decoder included in FIGS. 5 and 7, according to some embodiments.

In a similar manner as FIG. 9, for simplicity of illustration, base mesh encoder 1000 shows the components involved in base mesh decoding, as well as decoding mode decision module 1002 and mesh buffer 1004.

Shared Syntax for Encoding Compressed Base Mesh Bit Stream and Compressed Motion Bitstream In some embodiments, dynamic meshes may be encoded in a way that is agnostic to the video coding specification used to encode the dynamic mesh, with the ability to indicate which video specifications are used for the encoding of different video sub-streams. In some embodiments, a high-level syntax, as described herein, provides timing and referencing information, as well as enabling parallelization capabilities similar to subpictures or tiling in comparable video coding specifications.

In some embodiments, a base mesh signal can be encoded using any currently or future specified static mesh specification encoder. For example, such information could be coded using Draco 3D Graphics Compression or other 3D graphic compression procedures. This representation could provide the basis for applying other decoded information that would permit the reconstruction of the current mesh frame within the context of a video-based dynamic mesh compression decoder.

Furthermore, for coding subsequent mesh frames, temporal correlations that may exist with previously coded base mesh frames may be exploited. This may be accomplished by encoding a mesh motion field instead of directly encoding the base mesh, and using this information and a previously encoded base mesh to reconstruct the base mesh of the current frame. This approach could be seen as the equivalent of inter prediction in video coding.

In some embodiments, it is possibly to use the disclosed syntax to associate all coded base mesh frames or motion fields with information that could help determine their decoding output order as well as their referencing relationships. It is possible, for example, that better coding efficiency can be achieved if the coding order of all frames does not follow the display order or by using as reference for generating a motion field for frame N (an arbitrary previously coded motion field or base mesh) instead of the immediately previous coded one. In some embodiments, the ability to instantly detect random access points and independently decode multiple sub-meshes that together can form a single mesh, much like subpictures in video compression is supported.

Figure 11:
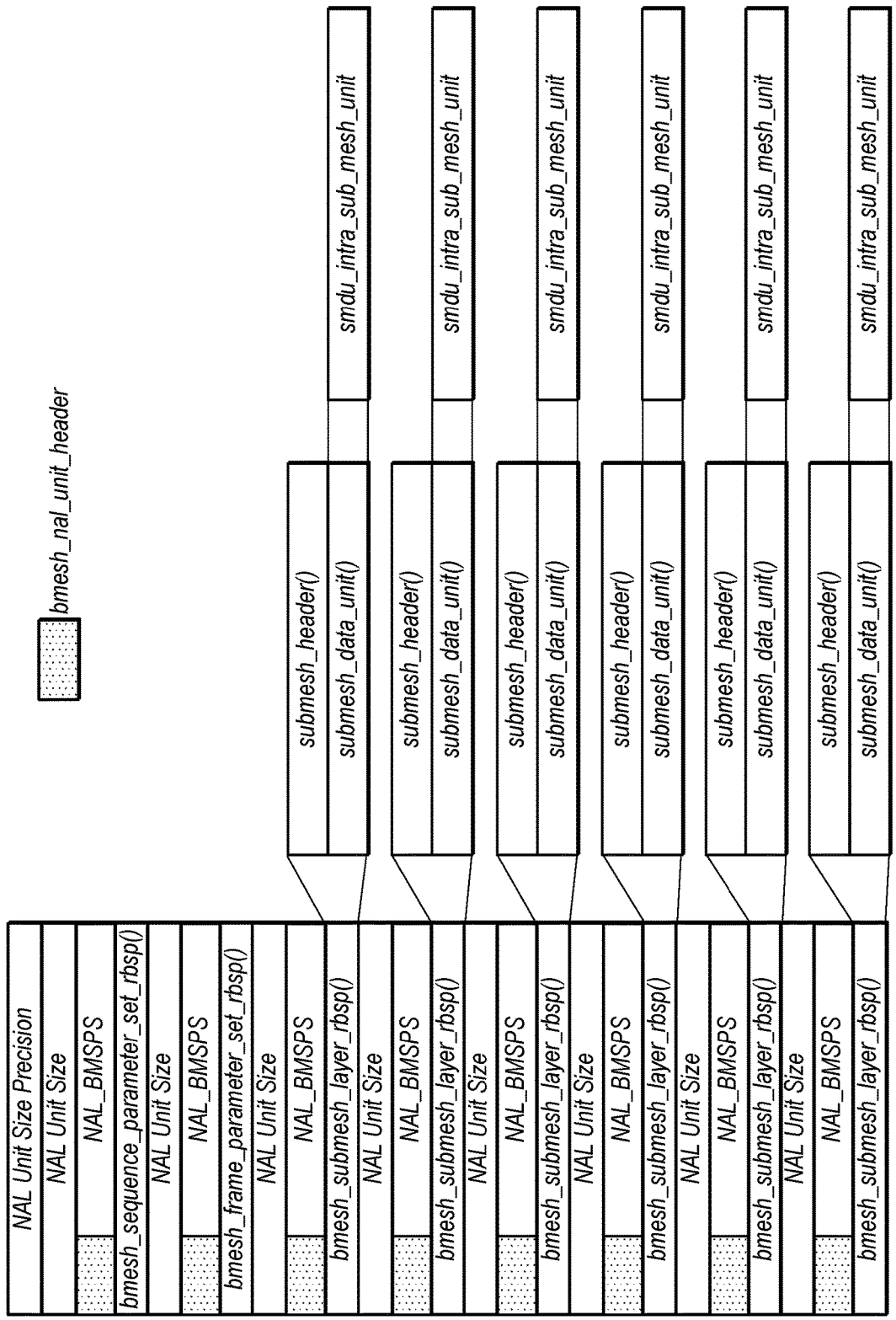
FIG. 11 illustrates an overview of a base mesh data sub-stream structure, according to some embodiments.

To achieve these advantages and various other advantages, a new Base Mesh Data Substream format is disclosed. The base mesh sub-bitstream may be constructed using NAL units. High Level Syntax (HLS) structures such as base mesh sequence parameter sets, base mesh frame parameter sets, sub-mesh layers, etc. are also specified. An overview of this bitstream with its different subcomponents is shown in FIG. 11.

Figure 12:
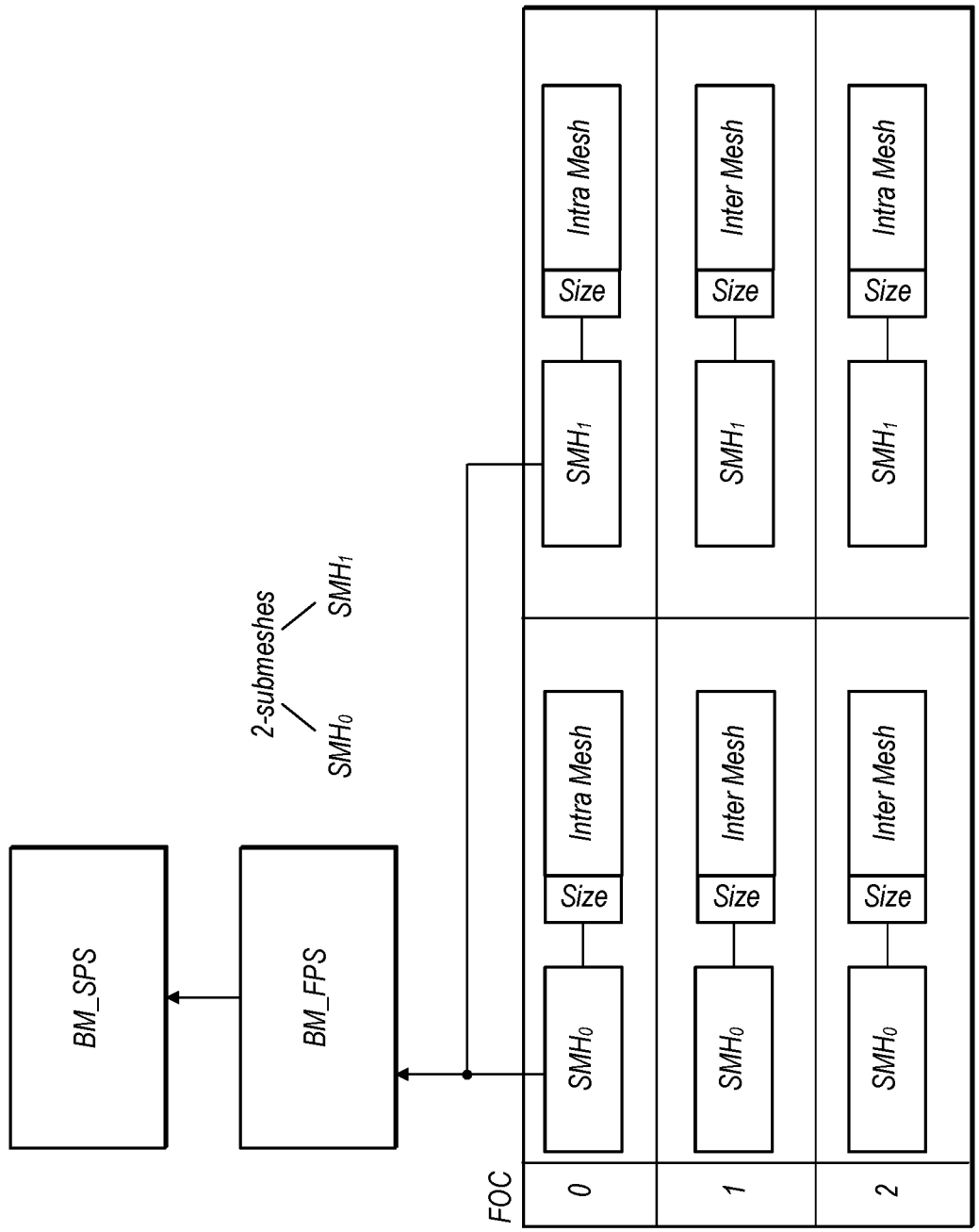
FIG. 12 illustrates the use of a base mesh sequence parameter set syntax and a base mesh frame parameter set to define syntax values to be used for a plurality of frames and/or sub-meshes, according to some embodiments.

For example, at a first level a base mesh sequence parameter set (BMSPS) may be communicated using network abstraction layer (NAL) units. These may also define raw byte sequence payloads. Moreover, as shown in FIG. 12 a base mesh frame parameter set may provide additional parameter for a given frame, wherein the base mesh sequence parameter set defines parameters to be used for a set of frames. Additionally, for a given sequence of frames or for an individual frame one or more sub-meshes may be defined, such as shown in FIG. 11. The sub-meshes may be communicated using a sub-mesh header and a sub-mesh data unit. While not shown in FIG. 11, in some embodiments, face groups may further be defined for a mesh or sub-mesh.

One of the desirable features of this design is the ability to segment a mesh into multiple smaller partitions, referred to herein as sub-meshes. These sub-meshes can be decoded completely independently, which can help with partial decoding and spatial random access. Although it may not be a requirement for all applications, some applications may require that the segmentation in sub-meshes remains consistent and fixed in time. The sub-meshes do not need to use the same coding type, i.e., for one frame one sub-mesh may use intra coding while for another inter coding could be used at the same decoding instance, but it is commonly a requirement that the same coding order is used and the same references are available for all sub-meshes corresponding at a particular time instance. Such restrictions can help guarantee proper random-access capabilities for the entire stream. An example where two sub-meshes are used is shown in FIG. 12. More details on sub-meshes are presented in the next section.

Figure 13:
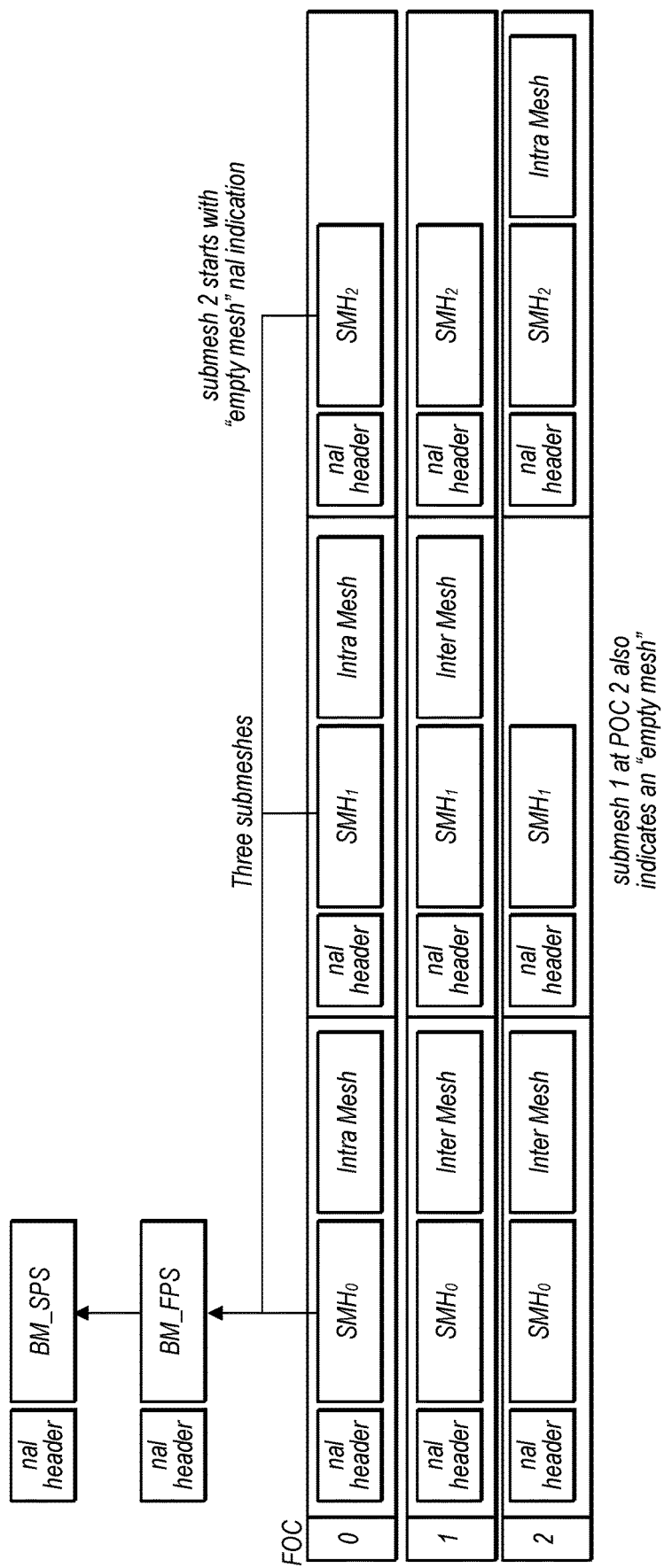
FIG. 13 illustrates an example mesh and its sub-meshes where facegroup IDs are explicitly given, according to some embodiments.
Figure 14:
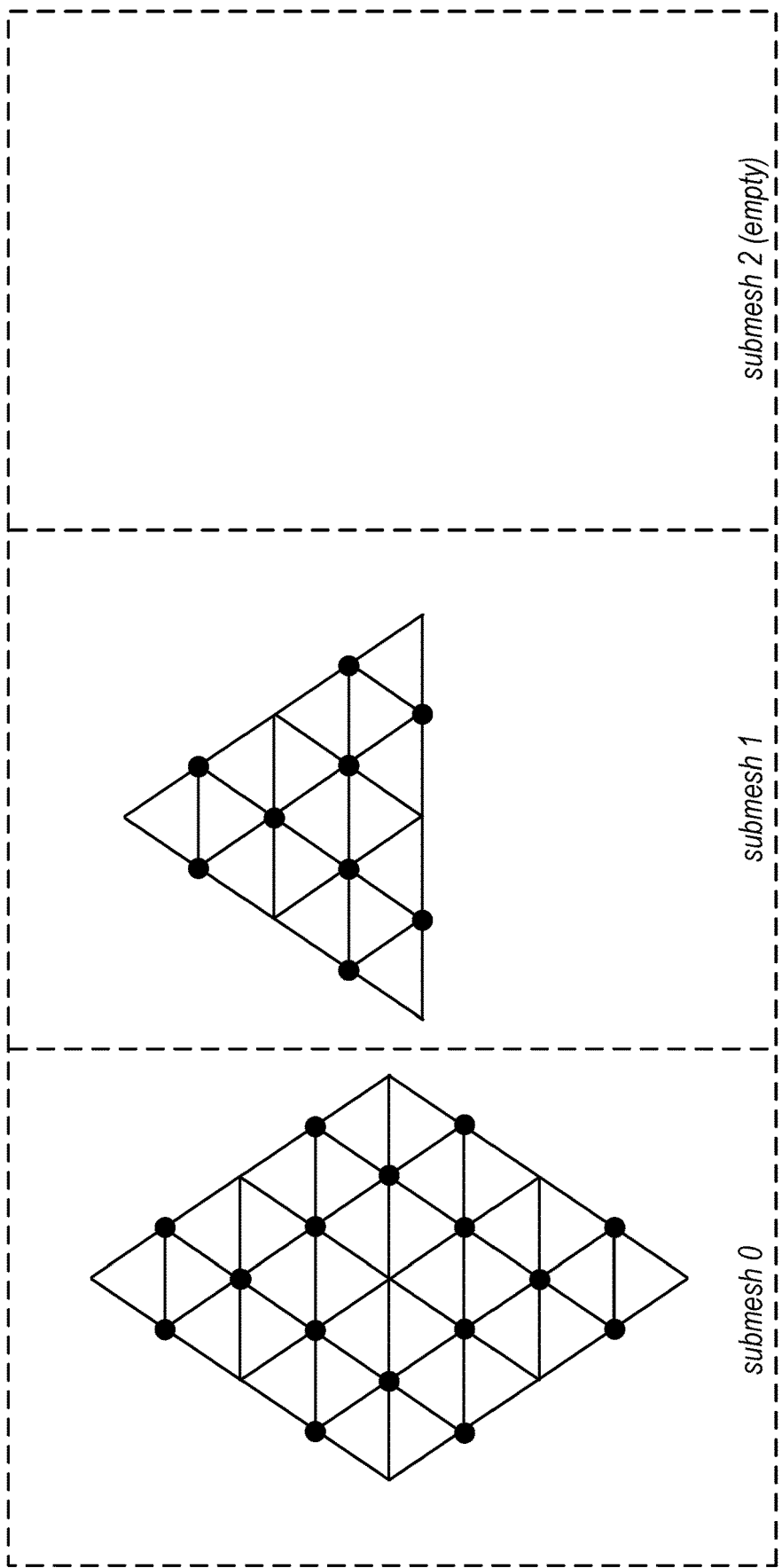
FIG. 14 illustrates an example input to a base mesh sub-stream decoder and the output from the base mesh sub-stream decoder, according to some embodiments.

Also, as shown in FIG. 13, in some embodiments, for certain point in time frames sub-meshes may be defined as empty. For example, FIG. 14 illustrates the sub-meshes 0, 1, and 2 at frame order count 0. For example, at frame order count zero corresponding to a point in time fame, sub mesh 2 is empty and remain empty at frame order count 1, but is occupied with an intra mesh at frame order count 2. As another example, sub-mesh 1 is occupied at frame order counts zero and 1, but is empty at frame order count 2.

Sub-Mesh and Face Groups

A sub-mesh is coded in one bmesh_submesh_layer( ) and is an independently decodable, complete/self-contained, subset of the mesh in a frame. Sub-meshes are associated with a series of vertices and after decoding, each decoded vertex of the entire mesh is also associated with its corresponding sub-mesh id, indicating the sub-mesh it belonged to.

In addition, for the sub-meshes, one feature that is supported by the base mesh sub-bitstream is the concept of a facegroup. A facegroup is a set of triangle faces in a sub-mesh. Each triangle face is associated with a facegroup ID indicating the facegroup it belongs to. When facegroup IDs are not explicitly given as attributes in the sub-bitstream, the sub-bitstream contains information how to derive them. Facegroup IDs are unique in a frame. The current syntax of the base mesh sub-bitstream also supports signaling the presence and the derivation process for facegroup IDs.

Figure 15:
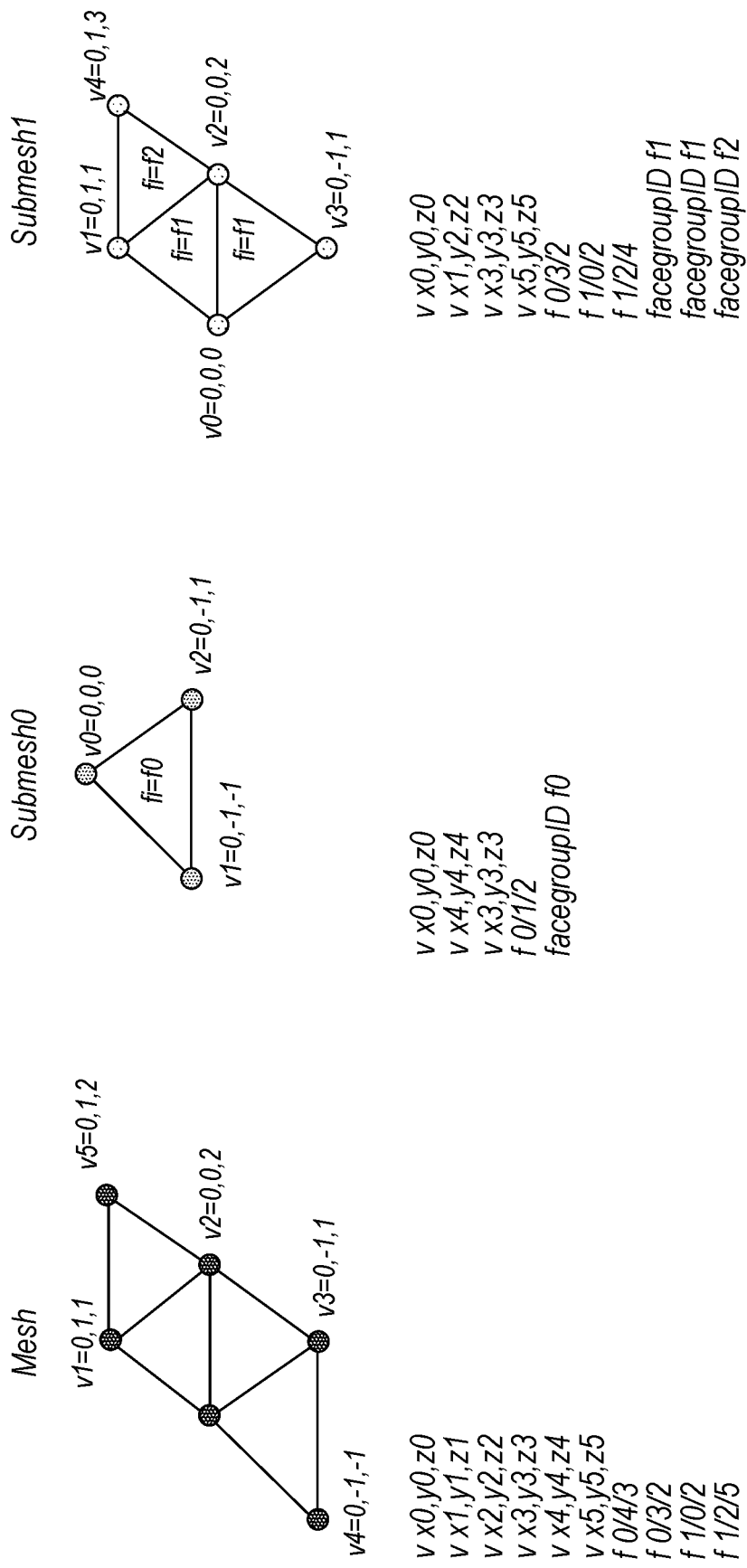
FIG. 15 illustrates the use of a base mesh sequence parameter set syntax and a base mesh frame parameter set to define syntax values to be used for a plurality of sub-meshes, wherein NAL units are further used to indicate whether a given sub-mesh is visible or non-visible at a given frame order count (e.g., moment in time), according to some embodiments.
Figure 16:
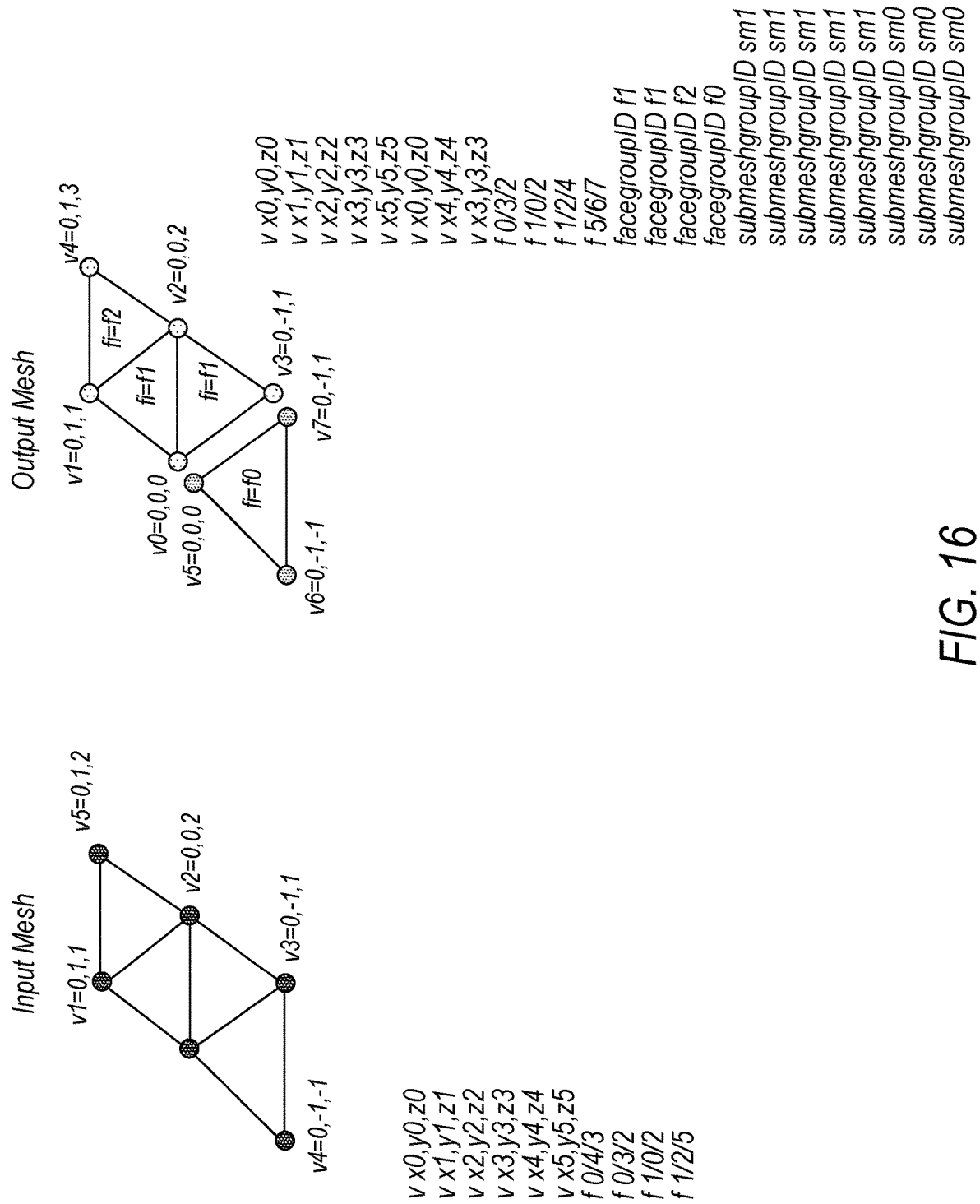
FIG. 16 illustrates, example sub-meshes corresponding to the sub-meshes shown in the syntax of FIG. 15 at frame order count 1, wherein sub-mesh 2 is indicated to be non-visible, according to some embodiments.

For example, FIG. 15 illustrates an example of a mesh and its sub-meshes when facegroup IDs are explicitly given. Note that Note (x0,y0,z0) and (x3,y3,z3) exist in both submesh0 and submesh1. Facegroup IDs are given to each face and they can be unique in a frame.

Network Abstraction Layer (NAL) Unit Syntax

As used herein the abbreviation TSA refers to temporal sub-layer access, and the abbreviation RB SP refers to raw byte sequence payload.

General NAL Unit Syntax

```
bmesh_nal_unit( NumBytesInNalUnit ) {
    bmesh_nal_unit_header( )
    NumBytesInRbsp = 0
    for( i = 2; i < NumBytesInNalUnit; i++ )
        rbsp_byte[ NumBytesInRbsp++ ]        b(8)
}
```

NAL Unit Header Syntax

```
bmesh_nal_unit_header( ) {
    bmesh_nal_forbidden_zero_bit          f(1)
    bmesh_nal_unit_type                   u(6)
    bmesh_nal_layer_id                    u(6)
    bmesh_nal_temporal_id_plus1           u(3)
}
```

NAL Unit Semantics

This section contains some of the semantics that correspond to the above syntax structures.

NumBytesInNalUnit specifies the size of the NAL unit in bytes. This value is required for decoding of the NAL unit. Some form of demarcation of NAL unit boundaries is necessary to enable inference of NumBytesInNalUnit. Various methods of demarcation can be specified. Note that the mesh coding layer (MCL) is specified to efficiently represent the content of the mesh data. The NAL units are used to specify a format for that data and provide header information in a manner appropriate for conveyance on a variety of communication channels or storage media. Data is contained in NAL units, each of which contains an integer number of bytes. A NAL unit specifies a generic format for use in both packet-oriented and bitstream systems. The format of NAL units for both packet-oriented transport and sample streams may be identical except that in a sample stream format each NAL unit can be preceded by an additional element that specifies the size of the NAL unit.

Raw sequence byte payload (RSBP) bytes, such as rbsp_byte[i] is the i-th byte of an RBSP. An RBSP is specified as an ordered sequence of bytes as follows. The RBSP comprises a string of data bits (SODB) as follows: If the SODB is empty (i.e., zero bits in length), the RBSP is also empty Otherwise, the RBSP contains the SODB as follows:
The first byte of the RBSP contains the first (most significant, left-most) eight bits of the SODB; the next byte of the RBSP contains the next eight bits of the SODB, etc., until fewer than eight bits of the SODB remain.

The rbsp_trailing_bits( ) syntax structure is present after the SODB as follows:
The first (most significant, left-most) bits of the final RBSP byte contain the remaining bits of the SODB (if any).
The next bit consists of a single bit equal to 1 (e.g., rbsp_stop_one_bit).
When the rbsp_stop_one_bit is not the last bit of a byte-aligned byte, one or more bits equal to 0 (e.g., instances of rbsp_alignment_zero_bit) are present to result in byte alignment.

Syntax structures having these RBSP properties are denoted in the syntax tables using an "_rbsp" suffix. These structures are carried within NAL units as the content of the rbsp_byte[i] data bytes.

When the boundaries of the RBSP are known, a decoder can extract the SODB from the RBSP by concatenating the bits of the bytes of the RBSP and discarding the rbsp_stop_one_bit, which is the last (least significant, right-most) bit equal to 1, and discarding any following (less significant, farther to the right) bits that follow it, which are equal to 0. The data necessary for the decoding process is contained in the SODB part of the RBSP.

NAL Unit Header Semantics

The concept of a sub-mesh and specific NAL units that correspond to coded mesh data are further defined. In addition, NAL units that can include metadata such as SEI messages are also defined.

In particular, the base mesh NAL unit types supported are specified as follows:

| bmesh_nal_unit type | Name of bmesh_nal_unit_type | Content of base mesh NAL unit and RBSP syntax structure | NAL unity pe class |
|---|---|---|---|
| 0 | NAL_TRAIL_N | Coded sub-mesh of a non-TSA, | BMC |
| 1 | NAL_TRAIL_R | non STSA trailing base mesh frame sub_mesh_layer_rbsp( ) | L |
| 2 | NAL_TSA_N | Coded sub-mesh of a TSA base | BMC |
| 3 | NAL_TSA_R | mesh frame sub_mesh_layer_rbsp( ) | L |
| 4 | NAL_STSA_N | Coded sub-mesh of a STSA | BMC |
| 5 | NAL_STSA_R | base mesh frame sub_mesh_layer_rbsp( ) | L |
| 6 | NAL_RADL_N | Coded sub-mesh of a RADL | BMC |
| 7 | NAL_RADL_R | base mesh frame sub_mesh_layer_rbsp( ) | L |
| 8 | NAL_RASL_N | Coded sub-mesh of a RASL | BMC |
| 9 | NAL_RASL_R | base mesh frame sub_mesh_layer_rbsp( ) | L |
| 10 | NAL_SKIP_N | Coded sub-mesh of a skipped | BMC |
| 11 | NAL_SKIP_R | base mesh frame sub_mesh_layer_rbsp( ) | L |
| 12 | NAL_RSV_BMCL_N12 | Reserved non-IRAP sub-layer | BMC |
| 14 | NAL_RSV_BMCL_N14 | non-reference BMCL mesh NAL unit types | L |
| 13 | NAL_RSV_BMCL_R13 | Reserved non-IRAP sub-layer | BMC |
| 15 | NAL_RSV_BMCL_R15 | reference BMCL mesh NAL unit types | L |
| 16 | NAL_BLA_W_LP | Coded sub-mesh of a BLA base | BMC |
| 17 | NAL_BLA_W_RADL | mesh frame sub_mesh_layer_rbsp( ) | L |
| 18 | NAL_BLA_N_LP | | |
| 19 | NAL_IDR_W_RADL | Coded sub-mesh of an IDR base | BMC |
| 20 | NAL_IDR_N_LP | mesh frame sub_mesh_layer_rbsp( ) | L |
| 21 | NAL_CRA | Coded sub-mesh of a CRA base mesh frame sub_mesh_layer_rbsp( ) | BMC L |

| bmesh_nal_unit type | Name of bmesh_nal_unit_type | Content of base mesh NAL unit and RBSP syntax structure | NAL unity pe class |
|---|---|---|---|
| 22 | NAL_RSV_IRAP_BMCL_22 | Reserved IRAP BMCL NAL unit types | BMCL |
| 23 | NAL_RSV_IRAP_BMCL_23 | | |
| 24 ... 29 | NAL_RSV_BMCL_24 ... NAL_RSV_BMCL_29 | Reserved non-IRAP BMCL NAL unit types | BMCL |
| 30 | NAL_BMSPS | Base mesh sequence parameter set bmesh_sequence_parameter_set_rbsp( ) | non-BMCL |
| 31 | NAL_BMFPS | Base mesh frame parameter set bmesh_frame_parameter_set_rbsp( ) | non-BMCL |
| 32 | NAL_AUD | Access unit delimiter access_unit_delimiter_rbsp( ) | non-BMCL |
| 33 | NAL_EOS | End of sequence end_of_sequence_rbsp( ) | non-BMCL |
| 34 | NAL_EOB | End of bitstream end_of_bmesh_sub_bitstream_rbsp( ) | non-BMCL |
| 35 | NAL_FD | Filler filler_data_rbsp( ) | non-BMCL |
| 36 | NAL_PREFIX_NSEI | Non-essential supplemental enhancement information sei_rbsp( ) | non-BMCL |
| 37 | NAL_SUFFIX_NSEI | | |
| 38 | NAL_PREFIX_ESEI | Essential supplemental enhancement information sei_rbsp( ) | non-BMCL |
| 39 | NAL_SUFFIX_ESEI | | |
| 40 ... 44 | NAL_RSV_NBMCL_40 NAL_RSV_NBMCL_44 | Reserved non-BMCL NAL unit types | non-BMCL |
| 45 ... 63 | NAL_UNSPEC_45 NAL_UNSPEC_63 | Unspecified non-BMCL NAL unit types | non-BMCL |

Raw Byte Sequence Payloads, Trailing Bits, and Byte Alignment Syntax

As with similar bitstreams, the primary syntax structure that is defined for a base mesh bitstream is a sequence parameter set. This syntax structure contains basic information about the bitstream, identifying features for the codecs supported for either the intra coded and inter coded meshes, as well as information about references, such as timing reference information.

General Base Mesh Sequence Parameter Set RBSP Syntax:

| | Descriptor |
|---|---|
| bmesh_sequence_parameter_set_rbsp( ) { | |
|   bmsps_sequence_parameter_set_id | u(4) |
|   bmesh_profile_tier_level( ) | |
|   bmsps_intra_mesh_codec_id | u(8) |
|   bmsps_inter_mesh_codec_id | u(8) |
|   bmsps_geometry_3d_bit_depth_minus1 | u(5) |
|   bmsps_facegroup_segmentation_method | ue(v) |
|   bmsps_mesh_attribute_count | u(7) |
|   for( i = 0; i < bmsps_mesh_attribute_count; i++ ) { | |
|     bmsps_mesh_attribute_type_id[ i ] | u(4) |
|     bmsps_attribute_bit_depth_minus1 [ i ] | u(5) |
|     bmsps_attribute_msb_align_flag[ i ] | u(1) |
|   } | |
| bmsps_log2_max_mesh_frame_order_cnt_lsb_minus4 | ue(v) |
| bmsps_max_dec_mesh_frame_buffering_minus1 | ue(v) |
| bmsps_long_term_ref_mesh_frames_flag | u(1) |
| bmsps_num_ref_mesh_frame_lists_in_bmsps | ue(v) |
| for( i = 0; i < bmsps_num_ref_mesh_frame_lists_in_bmsps; i++) | |
|   bmesh_ref_list_struct( i ) | |
| bmsps_extension_present_flag | u(1) |
| if( bmsps_extension_present_flag ) { | |
|   bmsps_extension_count_minus 1 | u(7) |
| } | |
| if( bmsps_extension_present_flag ){ | |
|   bmsps_extensions_length_minus1 | ue(v) |
|   while( more_rbsp_data( ) ) | |
|     bmsps_extension_data_flag | u(1) |
| } | |
|   rbsp_trailing_bits( ) | |
| } | |

Bmsps_intra_mesh_codec_id. The codec IDs could also have been specified independently for every sub-mesh. Though, due to complexity in the design it may be preferable to stick with a single codec for all sub-meshes. These codec IDs could be associated with a specific mesh or motion mesh codec through the profiles specified in the corresponding specification, or could be explicitly indicated with an SEI message (supplementary enhancement information message).

bmsps_intra_mesh_codec_id indicates the static mesh codec used to encode the base meshes in this base mesh data sub-stream.

bmsps_intra_mesh_data_size_precision_bytes_minus1 (+1) specifies the precision, in bytes, of the size of the coded mesh data.

bmsps_inter_mesh_codec_present_flag indicates if a specific codec indicated by bmsps_inter_mesh_codec_id is used to encode the inter predicted sub-meshes bmsps_inter_mesh_data_size_precision_bytes_minus1(+1) specifies the precision, in bytes, of the size of the inter predicted mesh data. This precision is signaled considering the size of the coded mesh data and the inter predicted mesh data (e.g., motion field) can be significantly different.

The parameter bmsps_facegroup_segmentation_method indicates how facegroups could be derived for a mesh. If the value is indicated as 0, then such information is present directly in the coded submesh. Other values indicate that the facegroup can be derived using different methodologies based on the characteristics of the stream. For example, value 1 means that there is no facegroup ID associated with any face. A value 2 means that all faces are identified with a single ID, a 3 that facegroups are identified based on the connected component method, while a value of 4 indicates that each individual face has its own unique ID. Ue(v) may be used to indicate bmsps_facegroup_segmentation_method, but fixed length coding or partitioning to more elements could be used instead.

Base Mesh Profile, Tier, and Level Syntax

|  | Descriptor |
|---|---|
| bmesh_profile_tier_level( ) { |  |
|   bmptl_tier_flag | u(1) |
|   bmptl_profile_codec_group_idc | u(7) |
|   bmptl_profile_toolset_idc | u(8) |
|   bmptl_reserved_zero_32bits | u(32) |
|   bmptl_level_idc | u(8) |
|   bmptl_num_sub_profiles | u(6) |
|   bmptl_extended_sub_profile_flag | u(1) |
|   for( i = 0; I < ptl_num_sub_profiles; i++ ) { |  |
|     bmptl_sub_profile_idc[ i ] | u(v) |
|   } |  |
|   bmptl_toolset_constraints_present_flag | u(1) |
|   if( bmptl_toolset_constraints_present_flag ) { |  |
|     bmesh_profile_toolset_constraints_information( ) |  |
|   } |  |
| } |  | bmptl_extended_sub_profile_flag providing support for sub profiles can be quite useful for further restricting the base mesh profiles depending on usage and applications.

Base Mesh Frame Parameter Set RBSP Syntax

The base mesh frame parameter set has the frame level information such as number of submeshes in the frames corresponding to one mfh_mesh_frm_order_cnt_lsb (mesh frame header, frame order count, least significant byte). A submesh is coded in one mesh_data_submesh_layer( ) and is independently decodable from other submeshes. In the case of inter frame prediction, a submesh can refer only to the submeshes with the same submesh id in its associated reference frames.

|  | Descriptor |
|---|---|
| bmesh_frame_parameter_set_rbsp( ) { |  |
|   bfps_mesh_sequence_parameter_set_id | u(4) |
|   bfps_mesh_frame_parameter_set_id | u(4) |
|   bmesh_sub_mesh_information( ) |  |
|   bfps_output_flag_present_flag | u(1) |
|   bfps_num_ref_idx_default_active_minus1 | ue(v) |
|   bfps_additional_lt_afoc_lsb_len | ue(v) |
|   bfps_rotation_qx | i(16) |
|   bfps_rotation_qy | i(16) |
|   bfps_rotation_qz | i(16) |
|   bfps_shift_x | i(16) |
|   bfps_shift_y | i(16) |
|   bfps_shift_z | i(16) |
|   bfps_extension_present_flag | u(1) |
|   if( bfps_extension_present_flag ) |  |
|     bfps_extension_8bits | u(8) |
|     if( bfps_extension_8bits ) |  |
|       while( more_rbsp_data( ) ) |  |
|         bfps_extension_data_flag | u(1) |
|   rbsp_trailing_bits( ) |  |
| } |  | bfps_rotation_qx, bfps_rotation_qy, bfps_rotation_qz specify x/y/z component for the rotation of the sub-meshes referring this base mesh frame parameter set (bfps) using the quaternion representation.

bfps_shift_x, bfps_shift_y and bfps_shift_z specify x/y/z component for the global translation of the submeshes referring this bfps In another embodiment, these components are not signaled here but can be included as a part of motion decoder.

|  | Descriptor |
|---|---|
| bmesh_sub_mesh_information( ) { |  |
|   bsmi_use_single_mesh_flag | u(1) |
|   if(!bsmi_use_single_mesh_flag){ |  |
|     bsmi_num_submeshes_minus1 | u(8) |
|   } |  |
|   else |  |
|     bsmi_num_submeshes_minus1 = 0) |  |
|   bsmi_signalled_submesh_id_flag | u(1) |
|   if( bsmi_signalled_submesh_id_flag ) { |  |
|     bmsi_signalled_submesh_id_length_minus1 | ue(v) |
|     for( i = 0; i < bmsi_signalled_submesh_id_length_minus1 + 1; i++) |  |
|       bmsi_submesh_id[ i ] | u(v) |
|       SubMeshIDToIndex[ bmsi_submesh_id[ i ] ] = i |  |
|       SubMeshIndexToID[ i ] = bmsi_submesh_id[ i ] |  |
|   } |  |
|   else |  |
|     for( i = 0; i < bsmi_num_submeshes_minus1 + 1; i++ ) { |  |
|       bmsi_submesh_id[ i ] = i |  |
|       SubMeshIDToIndex[ i ] = i |  |
|       SubMeshIndexToID[ i ] = i |  |
|     } |  |
| } |  |

Base Mesh Submesh Layer Rbsp Syntax

|  |
|---|
| bmesh_submesh_layer_rbsp( ) { |
|   submesh_header( ) |
|   ubmesh_data_unit( mfh_submesh_type, SubMeshUnitSize ) |
|   rbsp_trailing_bits( ) |
| } |

| | Descriptor |
|---|---|
| submesh_header( ) { | |
|   if( nal_unit_type >= NAL_BLA_W_LP && nal_unit_type <= NAL_RSV_IRAP_ACL_29 ) | |
|     smh_no_output_of_prior_submesh_frames_flag | u(1) |
|   smh_submesh_frame_parameter_set_id | u(4) |
|   smh_id | u(v) |
|   subMeshID = smh_id | |
|   smh_type | ue(v) |
|   if(smh_type == I_SUBMESH) | |
|     smh_facegroup_segmentation_method_overwrite_flag | u(1) |
|   if(smh_facegroup_segmentation_method_overwrite_flag) | |
|     smh_facegroup_segmentation_method | ue(v) |
|   if( bfps_output_flag_present_flag ) | |
|     smh_mesh_output_flag | u(1) |
|   smh_basemesh_frm_order_cnt_lsb | u(v) |
|   if( bmsps_num_ref_mesh_frame_lists_in_bmsps > 0 ) | |
|     smh_ref_basemesh_frame_list_msps_flag | u(1) |
|   if( smh_ref_basemesh_frame_list_msps_flag == 0) | |
|     ref_list_struct | |
|       ( bmsps_num_ref_mesh_frame_lists_in_bmsps ) | |
|   else if( bmsps_num_ref_mesh_frame_lists_in_bmsps > 1) | |
|     smh_ref_mesh_frame_list_idx | u(v) |
|   for( j = 0; j < NumLtrMeshFrmEntries[ RlsIdx ]; j++ ) { | |
|     msh_additional_mfoc_lsb_present_flag[ j ] | u(1) |
|     if( msh_additional_afoc_lsb_present_flag[ j ] ) | |
|       msh_additional_mfoc_lsb_val[ j ] | u(v) |
|   } | |
|   if( smh_type != SKIP_SUBMESH ) { | |
|     if( smh_type == P_SUBMESH && num_ref_entries[ RlsIdx ] > 1 ) { | |
|       msh_num_ref_idx_active_override_flag | u(1) |
|       if( msh_num_ref_idx_active_override_flag ) | |
|         msh_num_ref_idx_active_minus1 | ue(v) |
|     msh_global_motion_override_flag | U(1) |
|     if(msh_global_motion_present_flag){ | |
|       msh_rotation_qx | i(16) |
|       msh_rotation_qy | i(16) |
|       msh_rotation_qz | i(16) |
|       msh_shift_x | i(16) |
|       msh_shift_y | i(16) |
|       msh_shift_z | i(16) |
|     } | |
|   } | |
|   } | |
|   byte_alignment( ) | |
| } | |

A bmesh_submesh_layer corresponds to a mesh frame indicated by mfh_mesh_frame_order_cnt_lsb. One bmesh submesh layer rbsp or more can correspond to one mesh frame indicated by mfh_mesh_frm_order_cnt_lsb.

msh_mesh_id is the id of the current submesh contained in the mesh data submesh data. msh_submesh_type indicates how the mesh is coded. If mfh_submesh_type is I_SUBMESH, the mesh data is coded with the indicated static mesh codec. If mfh_submesh_type is P_SUBMESH, inter prediction is used to code the mesh data

| | mfh_submesh_type | name of mfh_submesh_type |
|---|---|---|
| 1 | 0 | I_SUBMESH |
| 2 | 1 | P_SUBMESH |
| 3 | 2 | SKIP_SUBMESH | smh_facegroup_segmentation_method_overwrite_flag indicates smh_facegroup_segmentation_method is used to generate facegroup ID for this submesh instead of bmsps_facegroup_segmentation_method. When smh_type is not I_SUBMESH, the flag is set as false.

In another embodiment, smh_facegroup_segmentation_method_overwrite_flag and smh_facegroup_segmentation_method are not signaled but bmsps_facegroup_segmentation_method is used for the entire sequence.

msh_ref_atals_frame_list_msps_flag is signalled to indicate ref_list_struct is re-signalled in the frame parameter set or not. If it is not re-signaled and the number of reference list in the MSPS is more than 1, the reference list index is signaled.

msh_global_motion_override_flag indicates the global shift and/or rotation parameters are present in this header. If this flag is true, the following values are signaled.

msh_rotation_qx, msh_rotation_qy, msh_rotation_qz specify x/y/z component for the rotation of the submeshes referring this bfps using the quaternion representation.

msh_shift_x, msh_shift_y and msh_shift_z specify x/y/z component for the global translation of the submeshes referring this bfps Submesh Data Unit

| | Descriptor |
|---|---|
| submesh_data_unit( subMeshID , unitSize) { | |
|   if( smh_type == I_SUBMESH ) { | |
|     smdu_intra_sub_mesh_unit(unitSize) | |
|   } | |
|   else if( smh_type == P_SUBMESH ) { | |
|     smdu_inter_sub_mesh_unit(unitSize) | |
|   } | |
|   else if( smh_type == SKIP_SUBMESH ) { | |
|     // TBD_skip_sub_mesh_data_unit( ) | |
|   } | |
| } | | smdu_intra_sub_mesh_unit(unitSize) contains a sub mesh unit stream of size unitSize, in bytes, as an ordered stream of bytes or bits within which the locations of unit boundaries are identifiable from patterns in the data. The format of such sub mesh unit stream is identified by a 4CC code as defined by bmptl_profile_codec_group_idc or by a component codec mapping SEI message.

smdu_inter_sub_mesh_unit(unitSize) contains a sub mesh unit stream of size unitSize, in bytes, as an ordered stream of bytes or bits within which the locations of unit boundaries are identifiable from patterns in the data. The format of such sub mesh unit stream is identified by a 4CC code as defined by bmptl_profile_codec_group_idc or by a component codec mapping SEI message.

Reconstruction of the Output Meshes of the Base Mesh Data Sub-Stream Decoder

As a part of video-based dynamic mesh compression, the output meshes in FIG. 15 may have facegroup ID and/or submesh ID. If bmsps_facegroup_segmentation_method is 0, one of the decoded attributes of the meshes from the static mesh decoder is facegroupId indicating which facegroups triangle faces belong to. When bmsps_facegroup_segmentation_method is not 0, facegroup id is calculated and assigned to each face based on bmsps_facegroup_segmentation_method. The submesh ID that indicates which submesh a vertex belong to can be one of the attributes. The submesh ID can be assigned based on smh_id.

For example, FIG. 15 is an example of the input and output of a basemesh substream decoder. Note vertex5 and vertex7 have the same positions as vertex0 and vertex3, respectively. Each vertex has a submeshgroupID and each triangle face has a facegroupID.

Signaling Empty Instances of Sub-Meshes for a Given Frame

In some embodiments, it is possible that objects in a scene may appear or disappear at any frame (e.g., moment in time, where a frame represents the scene at a given moment in time). One approach to deal with objects that enter and leave a scene is to start a new coded mesh sequence and initialize the coding process when the object enters or leaves the scene since otherwise the object may not have a reference. However, such an approach may be inefficient since all other areas/objects in the scene (other than the object that appeared/left the scene) could otherwise be signaled using prediction from previously coded mesh frames. Another approach may be to dynamically change the number of sub-meshes supported in every frame, but that might not be desirable in some implementations since commonly it is desirable to know how many objects/sub-meshes are present in the entire scene so as to help with rendering and object handling.

To address these issues, in some embodiments the concept of an "empty instance" sub-mesh frame is used. The "empty instance" sub-mesh frame can be communicated using a network abstraction layer (NAL) unit. For example, a NAL unit may be signaled in the bitstream at a particular time and in a way that corresponds with a particular sub-mesh at that frame instant. The NAL unit may indicate that the sub-mesh is to "disappear" and contains no vertices or other information for the given frame. This NAL unit can either persist until it is cancelled, or can be signaled for every subsequent frame for which the object is not present. In this way, no object exists at that instance in time (though reference information for constructing the object, when it re-appears, may be retained. The same object can reappear at a subsequent frame by re-sending the associated information or by performing inter prediction for that sub-mesh using a previous version of the sub-mesh that contained data for the object. This permits objects to disappear and re-appear while knowing how many possible objects may have been present in the scene.

For example, FIG. 13 illustrates the use of a base mesh sequence parameter set syntax and a base mesh frame parameter set to define syntax values to be used for a plurality of sub-meshes, wherein NAL units are further used to indicate whether a given sub-mesh is visible or non-visible at given frame order count (e.g., moment in time), according to some embodiments. Also, FIG. 14 illustrates, example sub-meshes corresponding to the sub-meshes shown in the syntax of FIG. 13 at frame order count 1, wherein sub-mesh 2 is indicated to be non-visible by the associated NAL unit, according to some embodiments.

In a particular example, it may be known that a total of 30 objects may appear in a scene, but in the beginning only 10 of those objects may appear and the remaining 20 may appear at different instances in time. In such circumstances, NAL units may be used to signal the objects in the scene in a plurality of ways.

In some embodiments, if a sub-mesh with a particular ID is not found in the bitstream it may be assumed that this sub-mesh was intentionally empty at that instance and that it might appear later in the scene. If a sub-mesh previously present in the bit stream disappears from the bit stream the decoder may assume that the sub-mesh content has disappeared.

In some embodiments, the above approach may frustrate data transmission resilience features of the decoder (e.g., the decoder may not know whether the sub-mesh ID was purposefully disappeared or dropped in communication). Thus, some embodiments may support some form of error resiliency, wherein the SPS or the FPS are used signal how an absent sub-mesh should be accounted for, e.g. For example, if flag set to 0, it should be considered as lost and perform error concealment, or, if set to 1, the sub-mesh is currently intentionally empty and nothing should be displayed.

In some embodiments, instead of skipping a sub-mesh, a new NAL unit type for a sub-mesh may be used that explicitly indicates that the sub-mesh is currently empty. The corresponding frame for this sub-mesh should likely not be allowed for inter prediction.

In some embodiments, such NAL units could occupy and waste a lot of bits if there are several empty sub-meshes, especially at the start of the bit stream. To address this issue, another NA unit that may be introduced to indicate an entire set/group of sub-meshes that are currently empty (empty sub-mesh group NAL unit). In this NAL unit type the IDs of all the sub-meshes that have this property are indicated, e.g., by signaling the total number of sub-meshes, and then, using a for loop, the IDs of every sub-mesh that is empty.

Using this approach, a more flexible mesh design can be supported, where objects can move into or out the scene at any time.

In some embodiments, a syntax for the "empty" sub-mesh NAL unit may be similar to the syntax shown below.

| bmesh_nal_unit type | Name of bmesh_nal_unit_type | 6Content of base mesh NAL unit and RBSP syntax structure | NAL unity pe class |
|---|---|---|---|
| 0 | NAL_TRAIL_N | Coded sub-mesh of a non-TSA, non STSA trailing base mesh frame sub_mesh_layer_rbsp( ) | BMC L |
| 1 | NAL_TRAIL_R | | |
| 2 | NAL_TSA_N | Coded sub-mesh of a TSA base mesh frame sub_mesh_layer_rbsp( ) | BMC L |
| 3 | NAL_TSA_R | | |
| 4 | NAL_STSA_N | Coded sub-mesh of a STSA base mesh frame sub_mesh_layer_rbsp( ) | BMC L |
| 5 | NAL_STSA_R | | |
| 6 | NAL_RADL_N | Coded sub-mesh of a RADL base mesh frame sub_mesh_layer_rbsp( ) | BMC L |
| 7 | NAL_RADL_R | | |
| 8 | NAL_RASL_N | Coded sub-mesh of a RASL base mesh frame sub_mesh_layer_rbsp( ) | BMC L |
| 9 | NAL_RASL_R | | |

| bmesh_nal_unit type | Name of bmesh_nal_unit_type | 6Content of base mesh NAL unit and RBSP syntax structure | NAL unity pe class |
| --- | --- | --- | --- |
| 10 | NAL_SKIP_N | Coded sub-mesh of a skipped base mesh frame sub_mesh_layer_rbsp( ) | BMCL |
| 11 | NAL_SKIP_R | | |
| 12 | NAL_RSV_BMCL_N12 | Reserved non-IRAP sub-layer non-reference BMCL mesh NAL unit types | BMCL |
| 14 | NAL_RSV_BMCL_N14 | | |
| 13 | NAL_RSV_BMCL_R13 | Reserved non-IRAP sub-layer reference BMCL mesh NAL unit types | BMCL |
| 15 | NAL_RSV_BMCL_R15 | | |
| 16 | NAL_BLA_W_LP | Coded sub-mesh of a BLA base mesh frame sub_mesh_layer_rbsp( ) | BMCL |
| 17 | NAL_BLA_W_RADL | | |
| 18 | NAL_BLA_N_LP | | |
| 19 | NAL_IDR_W_RADL | Coded sub-mesh of an IDR base mesh frame sub_mesh_layer_rbsp( ) | BMCL |
| 20 | NAL_IDR_N_LP | | |
| 21 | NAL_CRA | Coded sub-mesh of a CRA base mesh frame sub_mesh_layer_rbsp( ) | BMCL |
| 22 | NAL_RSV_IRAP_BMCL_22 | Reserved IRAP BMCL NAL unit types | BMCL |
| 23 | NAL_RSV_IRAP_BMCL_23 | | |
| 24 . . . 29 | NAL_RSV_BMCL_24 . . . NAL_RSV_BMCL_29 | Reserved non-IRAP BMCL NAL unit types | BMCL |
| 30 | NAL_BMSPS | Base mesh sequence parameter set bmesh_sequence_parameter_set_rbsp( ) | non-BMCL |
| 31 | NAL_BMFPS | Base mesh frame parameter set bmesh_frame_parameter_set_rbsp( ) | non-BMCL |
| 32 | NAL_AUD | Access unit delimiter access_unit_delimiter_rbsp( ) | non-BMCL |
| 33 | NAL_EOS | End of sequence end_of_sequence_rbsp( ) | non-BMCL |
| 34 | NAL_EOB | End of bitstream end_of_bmesh_sub_bitstream_rbsp( ) | non-BMCL |
| 35 | NAL_FD | Filler filler_data_rbsp( ) | non-BMCL |
| 36 | NAL_PREFIX_NSEI | Non-essential supplemental enhancement information sei_rbsp( ) | non-BMCL |
| 37 | NAL_SUFFIX_NSEI | | |
| 38 | NAL_PREFIX_ESEI | Essential supplemental enhancement information sei_rbsp( ) | non-BMCL |
| 39 | NAL_SUFFIX_ESEI | | |
| 40 | NAL_EMPTY_MESH | EMPTY sub-mesh sub_mesh_empty_layer_rbsp( ) | BMCL |
| 41 . . . 45 | NAL_RSV_NBMCL_41 NAL_RSV_NBMCL_45 | Reserved non-BMCL NAL unit types | non-BMCL |
| 46 . . . 63 | NAL_UNSPEC_46 NAL_UNSPEC_63 | Unspecified non-BMCL NAL unit types | non-BMCL |

Exemplary syntax of sub_mesh_layer_rbsp( )

```
sub_mesh_empty_layer_rbsp( ) {
    smelr_mesh_frame_parameter_set_id          u(4)
    smelr_mesh_irap_type                       u(4)
    smelr_number_of_submeshes_minus1           ue(v)
    for( i = 0; i < smelr_number_of_submeshes_minus1 + 1; i++)
        smelr_sub_mesh_id[ i ]                 u(v)
}
```

Version of the NAL unit structure with IRAP/CRA/BLA indications:

| bmesh_nal_unit_type | Name of bmesh_nal_unit_type | 6Content of base mesh NAL unit and RBSP syntax structure | NAL unity pe class |
|---|---|---|---|
| 0<br>1 | NAL_TRAIL_N<br>NAL_TRAIL_R | Coded sub-mesh of a non-TSA, non STSA trailing base mesh frame<br>sub_mesh_layer_rbsp( ) | BMCL |
| 2<br>3 | NAL_TSA_N<br>NAL_TSA_R | Coded sub-mesh of a TSA base mesh frame<br>sub_mesh_layer_rbsp( ) | BMCL |
| 4<br>5 | NAL_STSA_N<br>NAL_STSA_R | Coded sub-mesh of a STSA base mesh frame<br>sub_mesh_layer_rbsp( ) | BMCL |
| 6<br>7 | NAL_RADL_N<br>NAL_RADL_R | Coded sub-mesh of a RADL base mesh frame<br>sub_mesh_layer_rbsp( ) | BMCL |
| 8<br>9 | NAL_RASL_N<br>NAL_RASL_R | Coded sub-mesh of a RASL base mesh frame<br>sub_mesh_layer_rbsp( ) | BMCL |
| 10<br>11 | NAL_SKIP_N<br>NAL_SKIP_R | Coded sub-mesh of a skipped base mesh frame<br>sub_mesh_layer_rbsp( ) | BMCL |
| 12<br>14 | NAL_RSV_BMCL_N12<br>NAL_RSV_BMCL_N14 | Reserved non-IRAP sub-layer non-reference BMCL mesh NAL unit types | BMCL |
| 13<br>15 | NAL_RSV_BMCL_R13<br>NAL_RSV_BMCL_R15 | Reserved non-IRAP sub-layer reference BMCL mesh NAL unit types | BMCL |
| 16<br>17<br>18 | NAL_BLA_W_LP<br>NAL_BLA_W_RADL<br>NAL_BLA_N_LP | Coded sub-mesh of a BLA base mesh frame<br>sub_mesh_layer_rbsp( ) | BMCL |
| 19<br>20 | NAL_IDR_W_RADL<br>NAL_IDR_N_LP | Coded sub-mesh of an IDR base mesh frame<br>sub_mesh_layer_rbsp( ) | BMCL |
| 21 | NAL_CRA | Coded sub-mesh of a CRA base mesh frame<br>sub_mesh_layer_rbsp( ) | BMCL |
| 22<br>23 | NAL_RSV_IRAP_BMCL_22<br>NAL_RSV_IRAP_BMCL_23 | Reserved IRAP BMCL NAL unit types | BMCL |
| 24 . . . 29 | NAL_RSV_BMCL_24 . . . NAL_RSV_BMCL_29 | Reserved non-IRAP BMCL NAL unit types | BMCL |
| 30 | NAL_BMSPS | Base mesh sequence parameter set<br>bmesh_sequence_parameter_set_rbsp( ) | non-BMCL |
| 31 | NAL_BMFPS | Base mesh frame parameter set<br>bmesh_frame_parameter_set_rbsp( ) | non-BMCL |
| 32 | NAL_AUD | Access unit delimiter<br>access_unit_delimiter_rbsp( ) | non-BMCL |
| 33 | NAL_EOS | End of sequence<br>end_of_sequence_rbsp( ) | non-BMCL |
| 34 | NAL_EOB | End of bitstream<br>end_of_bmesh_sub_bitstream_rbsp( ) | non-BMCL |
| 35 | NAL_FD | Filler<br>filler_data_rbsp( ) | non-BMCL |
| 36<br>37 | NAL_PREFIX_NSEI<br>NAL_SUFFIX_NSEI | Non-essential supplemental enhancement information<br>sei_rbsp( ) | non-BMCL |
| 38<br>39 | NAL_PREFIX_ESEI<br>NAL_SUFFIX_ESEI | Essential supplemental enhancement information<br>sei_rbsp( ) | non-BMCL |
| 40 | NAL_EMPTY_MESH | EMPTY sub-mesh<br>sub_mesh_empty_layer_rbsp( ) | BMCL |
| 41 | NAL_CRA_EMPTY_MESH | CRA EMPTY sub-mesh<br>sub_mesh_empty_layer_rbsp( ) | BMCL |
| 42 | NAL_IRAP_EMPTY_MESH | IRAP EMPTY sub-mesh<br>sub_mesh_empty_layer_rbsp( ) | BMCL |
| 43 . . . 47 | NAL_RSV_NBMCL_43<br>NAL_RSV_NBMCL_47 | Reserved non-BMCL NAL unit types | non-BMCL |

| bmesh_nal_unit_type | Name of bmesh_nal_unit_type | 6Content of base mesh NAL unit and RBSP syntax structure | NAL unity pe class |
|---|---|---|---|
| 48 ... 63 | NAL_UNSPEC_48 NAL_UNSPEC_63 | Unspecified non-BMCL NAL unit types | non-BMCL |

Example Computer System

Figure 17:
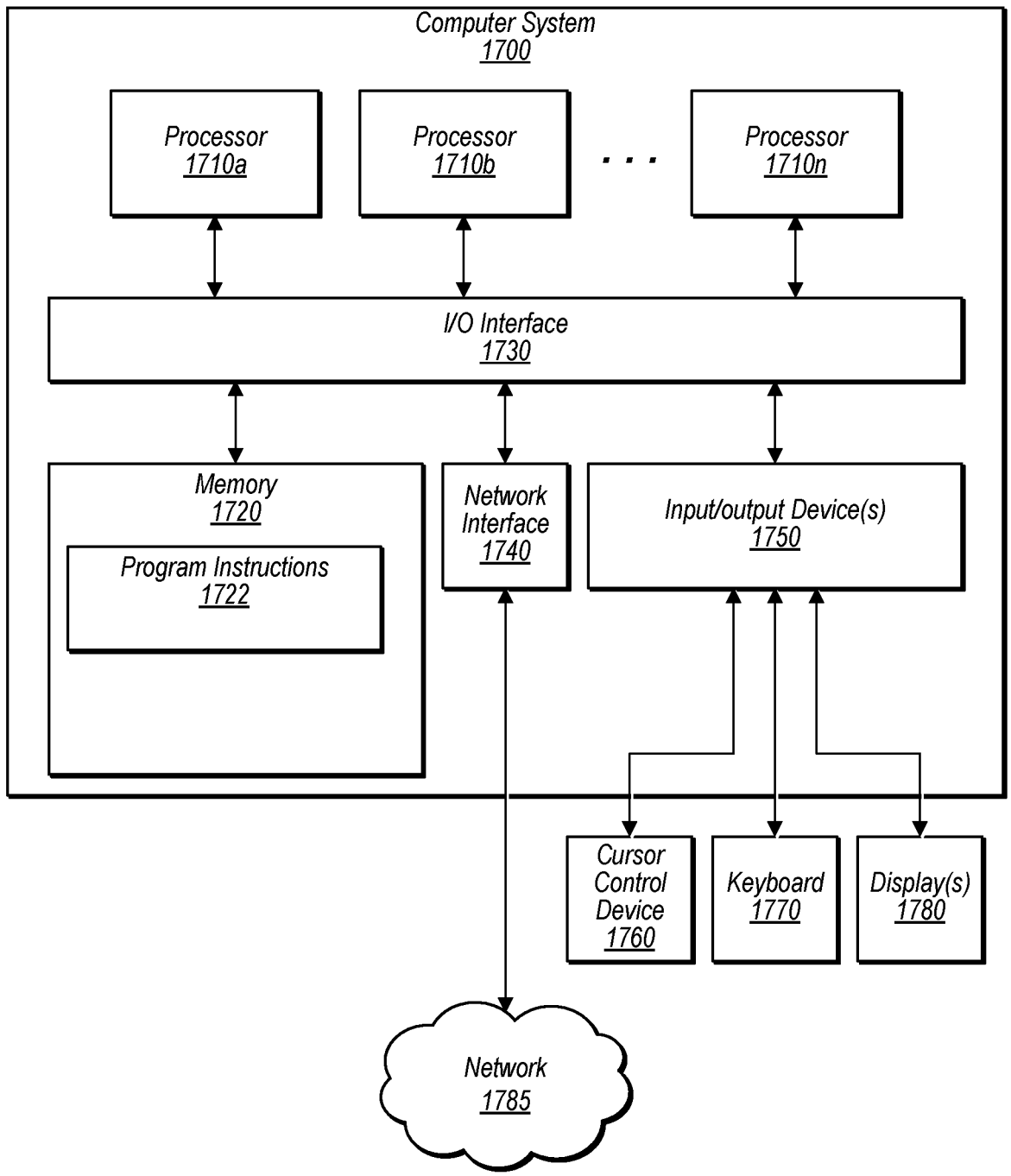
FIG. 17 illustrates an example computer system that may implement an encoder or decoder, according to some embodiments.

FIG. 17 illustrates an example computer system 1700 that may implement an encoder or decoder or any other ones of the components described herein, (e.g., any of the components described above with reference to FIGS. 1-16), in accordance with some embodiments. The computer system 1700 may be configured to execute any or all of the embodiments described above. In different embodiments, computer system 1700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1700, which may interact with various other devices. Note that any component, action, or functionality described above with respect to FIGS. 1-16 may be implemented on one or more computers configured as computer system 1700 of FIG. 17, according to various embodiments. In the illustrated embodiment, computer system 1700 includes one or more processors 1710 coupled to a system memory 1720 via an input/output (I/O) interface 1730. Computer system 1700 further includes a network interface 1740 coupled to I/O interface 1730, and one or more input/output devices 1750, such as cursor control device 1760, keyboard 1770, and display(s) 1780. In some cases, it is contemplated that embodiments may be implemented using a single instance of computer system 1700, while in other embodiments multiple such systems, or multiple nodes making up computer system 1700, may be configured to host different portions or instances of embodiments. For example, in one embodiment some elements may be implemented via one or more nodes of computer system 1700 that are distinct from those nodes implementing other elements.

In various embodiments, computer system 1700 may be a uniprocessor system including one processor 1710, or a multiprocessor system including several processors 1710 (e.g., two, four, eight, or another suitable number). Processors 1710 may be any suitable processor capable of executing instructions. For example, in various embodiments processors 1710 may be general-purpose or embedded processors implementing any of a variety of instruction set architectures (ISAs), such as the x86, PowerPC, SPARC, or MIPS ISAs, or any other suitable ISA. In multiprocessor systems, each of processors 1710 may commonly, but not necessarily, implement the same ISA.

System memory 1720 may be configured to store point cloud compression or point cloud decompression program instructions 1722 and/or sensor data accessible by processor 1710. In various embodiments, system memory 1720 may be implemented using any suitable memory technology, such as static random-access memory (SRAM), synchronous dynamic RAM (SDRAM), nonvolatile/Flash-type memory, or any other type of memory. In the illustrated embodiment, program instructions 1722 may be configured to implement an image sensor control application incorporating any of the functionality described above. In some embodiments, program instructions and/or data may be received, sent or stored upon different types of computer-accessible media or on similar media separate from system memory 1720 or computer system 1700. While computer system 1700 is described as implementing the functionality of functional blocks of previous Figures, any of the functionality described herein may be implemented via such a computer system.

In one embodiment, I/O interface 1730 may be configured to coordinate I/O traffic between processor 1710, system memory 1720, and any peripheral devices in the device, including network interface 1740 or other peripheral interfaces, such as input/output devices 1750. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processor 1710.

Network interface 1740 may be configured to allow data to be exchanged between computer system 1700 and other devices attached to a network 1785 (e.g., carrier or agent devices) or between nodes of computer system 1700. Network 1785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1750 may, in some embodiments, include one or more display terminals, keyboards, keypads, touchpads, scanning devices, voice or optical recognition devices, or any other devices suitable for entering or accessing data by one or more computer systems 1700. Multiple input/output devices 1750 may be present in computer system 1700 or may be distributed on various nodes of computer system 1700. In some embodiments, similar input/output devices may be separate from computer system 1700 and may interact with one or more nodes of computer system 1700 through a wired or wireless connection, such as over network interface 1740.

As shown in FIG. 17, memory 1720 may include program instructions 1722, which may be processor-executable to implement any element or action described above. In one embodiment, the program instructions may implement the methods described above. In other embodiments, different elements and data may be included. Note that data may include any data or information described above.

Those skilled in the art will appreciate that computer system 1700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1700 may be transmitted to computer system 1700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory, computer-readable, storage medium storing program instructions, that when executed using one or more computing devices, cause the one or more computing devices to:
   signal compressed data representing a dynamic mesh using:
   a sequence parameter set or a frame parameter set comprising syntax definitions for implementing timing information that enables synchronization of point in time frames of:
   a base mesh sub-bitstream for the dynamic mesh; and
   a displacement sub-bitstream for the dynamic mesh, wherein, for the point in time frames:
   the base mesh sub-bitstream comprises information for reconstructing a base mesh for the dynamic mesh; and
   the displacement sub-bitstream comprises information for vectors to be applied at subdivision points of the base mesh to reconstruct the dynamic mesh.

2. The non-transitory, computer-readable, storage medium of claim 1, wherein the syntax definitions further comprise syntax definitions to be used for both an intra-frame encoded compressed instance of the base mesh and an inter-frame compressed instance of the base mesh, wherein intra-frame compression and inter-frame compression are used to signal respective instances of the base mesh corresponding to different respective ones of the point in time frames.

3. The non-transitory, computer-readable, storage medium of claim 2,
   wherein the compressed base mesh sub-bitstream comprises compressed mesh data that has been intra-encoded for a given temporal frame of the dynamic mesh; and
   wherein the compressed base mesh sub-bitstream comprises compressed mesh data that has been inter-encoded for another temporal frame of the dynamic mesh and references the temporal frame comprising the base mesh or an additional temporal frame for the dynamic mesh.

4. The non-transitory, computer-readable, storage medium of claim 2, wherein a type of decoder to be used for the intra-frame encoded compressed instances of the base mesh is signaled in the sequence parameter set.

5. The non-transitory, computer-readable, storage medium of claim 2, wherein, for a given one of the point in time frames, an alternative type of decoder is signaled in a frame parameter set for the given point in time frame, wherein the alternative type of decoder is to be used for decoding a given intra-frame encoded compressed instance of the base mesh for the given one of the point in time frames.

6. The non-transitory, computer-readable, storage medium of claim 2, wherein a type of decoder to be used for the inter-frame encoded compressed instances of the base mesh is signaled in the sequence parameter set.

7. The non-transitory, computer-readable, storage medium of claim 6, wherein, for a given one of the point in time frames, an alternative type of decoder is signaled in a frame parameter set for the given point in time frame, wherein the alternative type of decoder is to be used for decoding a given inter-frame encoded compressed instance of the base mesh for the given one of the point in time frames.

8. The non-transitory, computer-readable, storage medium of claim 1, wherein the dynamic mesh comprises a plurality of sub-meshes, and wherein the sequence parameter set or the frame parameter set defines the respective sub-meshes of the dynamic mesh.

9. The non-transitory, computer-readable, storage medium of claim 8, wherein a given one of the sub-meshes comprises a plurality of face groups, and wherein the sequence parameter set, the frame parameter set, or a sub-mesh header defines one or more of the face groups.

10. The non-transitory, computer-readable, storage medium of claim 8, wherein:
at a first point in time frame for the dynamic mesh, a first set of one or more NAL units corresponding to one or more of the sub-meshes indicate that the sub-meshes are not present in the dynamic mesh, and
at a second point in time frame for the dynamic mesh, a second set of the one or more NAL units corresponding to the one or more sub-meshes indicate at least one of the sub-meshes is present in the dynamic mesh for the second point in time frame.

11. The non-transitory, computer-readable, storage medium of claim 10, wherein, for point in time frames using inter-frame encoding, base mesh reference information for the one or more sub-meshes indicated as not present at a first point in time frame is signaled in a way that a decoder retains the base mesh reference information for use in reconstructing the at least one sub-mesh that is present in the dynamic mesh for the second point in time frame.

12. A non-transitory, computer-readable, storage medium storing program instructions, that when executed using one or more computing devices, cause the one or more computing devices to:
receive one or more bitstreams for a compressed dynamic mesh, at least one of the bitstreams comprising:
a sequence parameter set or a frame parameter set comprising syntax definitions for implementing timing information that enables synchronization of point in time frames of:
a base mesh sub-bitstream for the dynamic mesh; and
a displacement sub-bitstream for the dynamic mesh, wherein, for the point in time frames:
the base mesh sub-bitstream comprises information for reconstructing a base mesh for the dynamic mesh; and
the displacement sub-bitstream comprises information for vectors to be applied at subdivision points of the base mesh to reconstruct the dynamic mesh;
synchronize, using the timing information, the base mesh sub-bitstream and the displacement sub-bitstream; and
reconstruct, for respective ones of a plurality of point in time frames, respective instances of the dynamic mesh using the synchronized base mesh and displacement sub-bitstreams.

13. The non-transitory, computer-readable, storage medium of claim 12, wherein the syntax definitions further comprise syntax definitions to be used for both an intra-frame encoded compressed instance of the base mesh and an inter-frame compressed instance of the base mesh, wherein intra-frame compression and inter-frame compression are used to signal respective instances of the base mesh corresponding to different respective ones of the point in time frames.

14. The non-transitory, computer-readable, storage medium of claim 13,
wherein the compressed base mesh sub-bitstream comprises compressed mesh data that has been intra-encoded for a given temporal frame of the dynamic mesh; and
wherein the compressed base mesh sub-bitstream comprises compressed mesh data that has been inter-encoded for another temporal frame of the dynamic mesh and references the temporal frame comprising the base mesh or an additional temporal frame for the dynamic mesh.

15. The non-transitory, computer-readable, storage medium of claim 13, wherein a type of decoder to be used for the intra-frame encoded compressed instances of the base mesh is signaled in the sequence parameter set or the frame parameter set.

16. The non-transitory, computer-readable, storage medium of claim 13, wherein:
at a first point in time frame for the dynamic mesh, a syntax element corresponding to one or more sub-meshes indicate that the sub-meshes are not present in the dynamic mesh, and
at a second point in time frame for the dynamic mesh, a second set of the one or more syntax elements corresponding to the one or more sub-meshes indicate at least one of the sub-meshes is present in the dynamic mesh for the second point in time frame.

17. The non-transitory, computer-readable, storage medium of claim 16, wherein, for point in time frames using inter-frame encoding, base mesh reference information for the one or more sub-meshes indicated as not present at a first point in time frame is retained, by a decoder, for use in reconstructing the at least one sub-mesh that is present in the dynamic mesh for the second point in time frame.

18. A device, comprising:
one or more processors; and
a memory storing program instructions, that when executed using the one or more processors, cause the one or more processors to:
receive one or more bitstreams for a compressed dynamic mesh, at least one of the bitstreams comprising:
a sequence parameter set or a frame parameter set comprising syntax definitions for implementing timing information that enables synchronization of point in time frames of:
a base mesh sub-bitstream for the dynamic mesh; and
a displacement sub-bitstream for the dynamic mesh, wherein, for the point in time frames:
- the base mesh sub-bitstream comprises information for reconstructing a base mesh for the dynamic mesh; and
- the displacement sub-bitstream comprises information for vectors to be applied at subdivision points of the base mesh to reconstruct the dynamic mesh;

synchronize, using the timing information, the base mesh sub-bitstream and the displacement sub-bitstream; and reconstruct, for respective ones of a plurality of point in time frames, respective instances of the dynamic mesh using the synchronized base mesh and displacement sub-bitstreams.

19. The device of claim 18, wherein the syntax definitions further comprise syntax definitions to be used for both an intra-frame encoded compressed instance of the base mesh and an inter-frame compressed instance of the base mesh, wherein intra-frame compression and inter-frame compression are used to signal respective instances of the base mesh corresponding to different respective ones of the point in time frames.

20. The device of claim 18, wherein, for point in time frames using inter-frame encoding, base mesh reference information for the one or more sub-meshes indicated as not present at a first point in time frame is retained, by a decoder, for use in reconstructing the at least one sub-mesh that is present in the dynamic mesh for the second point in time frame.

* * * * *